(12) United States Patent
Fukumori et al.

(10) Patent No.: US 10,060,507 B2
(45) Date of Patent: Aug. 28, 2018

(54) BICYCLE CHAIN

(71) Applicant: SHIMANO INC., Sakai (JP)

(72) Inventors: Tsuyoshi Fukumori, Sakai (JP);
Toshinari Oishi, Sakai (JP)

(73) Assignee: SHIMANO INC., Sakai (JP)

( * ) Notice: Subject to any disclaimer, the term of this patent is extended or adjusted under 35 U.S.C. 154(b) by 197 days.

(21) Appl. No.: 15/139,270

(22) Filed: Apr. 26, 2016

(65) Prior Publication Data
US 2017/0307049 A1   Oct. 26, 2017

(51) Int. Cl.
*F16G 13/06*   (2006.01)

(52) U.S. Cl.
CPC .................................. *F16G 13/06* (2013.01)

(58) Field of Classification Search
CPC ......................................................... F16G 13/06
See application file for complete search history.

(56) References Cited

U.S. PATENT DOCUMENTS

| | | | | |
|---|---|---|---|---|
| 7,946,941 B2* | 5/2011 | Oishi | ...................... | F16G 13/06 474/206 |
| 9,303,726 B2* | 4/2016 | Fukumori | ................ | B62M 9/00 |
| 2005/0202914 A1 | 9/2005 | Reiter et al. | | |
| 2008/0119312 A1* | 5/2008 | Oishi | ...................... | F16G 13/06 474/206 |
| 2015/0094180 A1* | 4/2015 | Fukumori | ................ | B62M 9/00 474/206 |
| 2015/0094181 A1* | 4/2015 | Fukumori | ................ | B62M 9/00 474/206 |
| 2015/0094182 A1* | 4/2015 | Fukumori | ............... | F16G 13/06 474/206 |
| 2015/0292597 A1* | 10/2015 | Fukumori | ............... | F16G 15/12 474/226 |
| 2017/0067535 A1* | 3/2017 | Fukumori | ............... | F16G 13/06 |

* cited by examiner

*Primary Examiner* — Michael R Mansen
*Assistant Examiner* — Robert T Reese
(74) *Attorney, Agent, or Firm* — Mori & Ward, LLP

(57) ABSTRACT

A bicycle chain comprises an inner link plate. The inner link plate comprises a first inner-link end portion, a second inner-link end portion, an inner-link intermediate portion, at least one first inner-link chamfered portion, and at least one second inner-link chamfered portion. The at least one first inner-link chamfered portion is provided at least on an inner-link outer peripheral edge in a first inner-link surface. The at least one second inner-link chamfered portion is provided at least on the inner-link outer peripheral edge in a second inner-link surface. The at least one first inner-link chamfered portion has a first non-overlapped portion with respect to the at least one second inner-link chamfered portion when viewed from an axial direction. The at least one second inner-link chamfered portion has a second non-overlapped portion with respect to the at least one first inner-link chamfered portion when viewed from the axial direction.

14 Claims, 26 Drawing Sheets

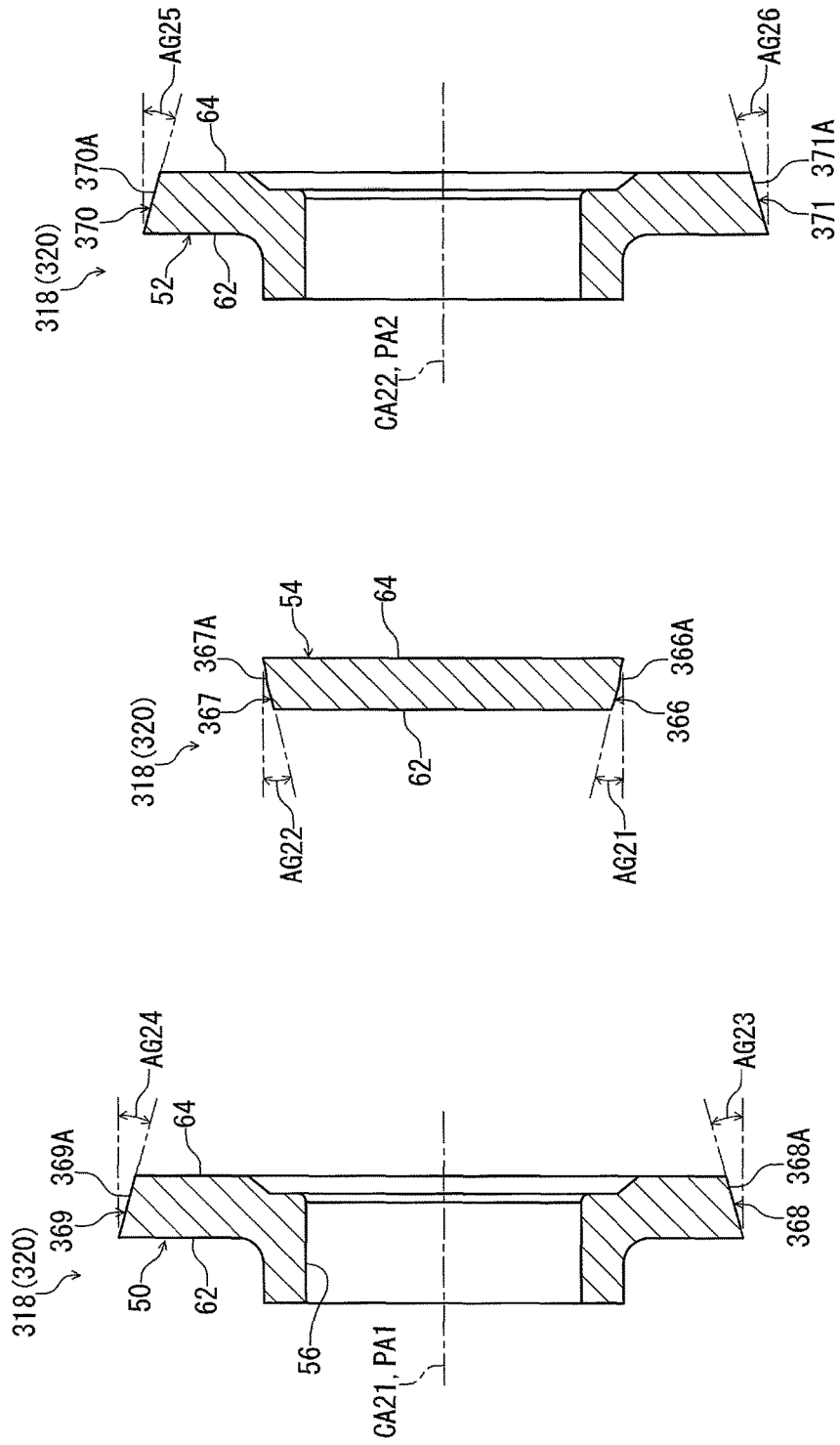

BICYCLE CHAIN

BACKGROUND OF THE INVENTION

Field of the Invention

The present invention relates to a bicycle chain.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a chain.

SUMMARY OF THE INVENTION

In accordance with a first aspect of the present invention, a bicycle chain comprises an inner link plate. The inner link plate comprises a first inner-link end portion, a second inner-link end portion, an inner-link intermediate portion, a first inner-link surface, a second inner-link surface, at least one first inner-link chamfered portion, and at least one second inner-link chamfered portion. The first inner-link end portion includes a first inner-link opening having a first inner-link center axis. The second inner-link end portion includes a second inner-link opening having a second inner-link center axis. The inner-link intermediate portion interconnects the first inner-link end portion and the second inner-link end portion. The first inner-link end portion, the second inner-link end portion and the inner-link intermediate portion define an inner-link outer peripheral edge. The second inner-link surface is opposite to the first inner-link surface in an axial direction parallel to the first inner-link center axis. The at least one first inner-link chamfered portion is provided at least on the inner-link outer peripheral edge in the first inner-link surface. The at least one second inner-link chamfered portion is provided at least on the inner-link outer peripheral edge in the second inner-link surface. The at least one first inner-link chamfered portion has a first non-overlapped portion with respect to the at least one second inner-link chamfered portion when viewed from the axial direction. The at least one second inner-link chamfered portion has a second non-overlapped portion with respect to the at least one first inner-link chamfered portion when viewed from the axial direction.

With the bicycle chain according to the first aspect, it is possible to satisfy both of gear-holding performance and shifting performance of the bicycle chain with achieving sufficient strength of the bicycle chain by the at least one first inner-link chamfered portion and the at least one second inner-link chamfered portion because the at least one first inner-link chamfered portion has a first non-overlapped portion with respect to the at least one second inner-link chamfered portion when viewed from the axial direction and the at least one second inner-link chamfered portion has a second non-overlapped portion with respect to the at least one first inner-link chamfered portion when viewed from the axial direction.

In accordance with a second aspect of the present invention, the bicycle chain according to the first aspect is configured so that the at least one first inner-link chamfered portion is disposed in the first inner-link surface without overlapping with the at least one second inner-link chamfered portion when viewed from the axial direction.

With the bicycle chain according to the second aspect, it is possible to effectively achieve sufficient strength of the bicycle chain because the at least one first inner-link chamfered portion does not entirely overlap with the at least one second inner-link chamfered portion when viewed from the axial direction.

In accordance with a third aspect of the present invention, the bicycle chain according to any one of the above aspects is configured so that the at least one first inner-link chamfered portion includes a plurality of first inner-link chamfered portions each provided at least on the inner-link outer peripheral edge in the first inner-link surface.

With the bicycle chain according to the third aspect, it is possible to arrange the plurality of first inner-link chamfered portions symmetrically relative to a point. This can improve ease of assembly of the bicycle chain.

In accordance with a fourth aspect of the present invention, the bicycle chain according to any one of the above aspects is configured so that the inner link plate has an inner-link longitudinal centerline, an inner-link traverse centerline perpendicular to the inner-link longitudinal center line, and an inner-link center point at which the inner-link longitudinal centerline and the inner-link traverse centerline intersect with each other. The plurality of first inner-link chamfered portions are disposed symmetrically about the inner-link center point.

With the bicycle chain according to the fourth aspect, it is possible to further improve the ease of assembly of the bicycle chain.

In accordance with a fifth aspect of the present invention, the bicycle chain according to any one of the above aspects is configured so that the at least one second inner-link chamfered portion includes a plurality of second inner-link chamfered portions each provided at least on the inner-link outer peripheral edge in the second inner-link surface.

With the bicycle chain according to the fifth aspect, it is possible to arrange the plurality of second inner-link chamfered portions symmetrically relative to a point. This can improve ease of assembly of the bicycle chain.

In accordance with a sixth aspect of the present invention, the bicycle chain according to any one of the above aspects is configured so that the inner link plate has an inner-link longitudinal centerline, an inner-link traverse centerline perpendicular to the inner-link longitudinal center line, and an inner-link center point at which the inner-link longitudinal centerline and the inner-link traverse centerline intersect with each other. The plurality of second inner-link chamfered portions are disposed symmetrically about the inner-link center point.

With the bicycle chain according to the sixth aspect, it is possible to further improve the ease of assembly of the bicycle chain.

In accordance with a seventh aspect of the present invention, the bicycle chain according to any one of the above aspects is configured so that the at least one first inner-link chamfered portion is provided in one of the first inner-link end portion and the second inner-link end portion. The at least one second inner-link chamfered portion is provided in the other of the first inner-link end portion and the second inner-link end portion.

With the bicycle chain according to the seventh aspect, it is possible to easily arrange the at least one first inner-link chamfered portion and the at least one second inner-link chamfered portion so as not to overlap with each other when viewed from the axial direction. This can effectively achieve sufficient strength of the bicycle chain.

In accordance with an eighth aspect of the present invention, the bicycle chain according to any one of the above aspects is configured so that the at least one first inner-link chamfered portion is further provided in the inner-link intermediate portion.

With the bicycle chain according to the eighth aspect, it is possible to effectively improve at least one of the gear-holding performance and the shifting performance.

In accordance with a ninth aspect of the present invention, the bicycle chain according to any one of the above aspects is configured so that the at least one first inner-link chamfered portion has a first inner-link chamfered length defined along the inner-link outer peripheral edge. The at least one second inner-link chamfered portion has a second inner-link chamfered length defined along the inner-link outer peripheral edge. The second inner-link chamfered length is different from the first inner-link chamfered length.

With the bicycle chain according to the ninth aspect, it is possible to easily arrange the at least one first inner-link chamfered portion and the at least one second inner-link chamfered portion so as not to overlap with each other when viewed from the axial direction. This can effectively achieve sufficient strength of the bicycle chain with improving the gear-holding performance and the shifting performance of the bicycle chain.

In accordance with a tenth aspect of the present invention, the bicycle chain according to any one of the above aspects is configured so that the first inner-link chamfered length is larger than the second inner-link chamfered length.

With the bicycle chain according to the tenth aspect, it is possible to effectively improve at least one of the gear-holding performance and the shifting performance of the bicycle chain.

In accordance with an eleventh aspect of the present invention, the bicycle chain according to any one of the above aspects is configured so that the inner link plate has an inner-link longitudinal centerline, an inner-link sprocket facing side defined with respect to the inner-link longitudinal centerline, and an inner-link sprocket far side defined on an opposite side of the inner-link sprocket facing side with respect to the inner-link longitudinal centerline. The inner-link sprocket facing side is closer to a rotational center axis of a bicycle sprocket than the inner-link sprocket far side in a state where the bicycle chain is engaged with the bicycle sprocket. The at least one first inner-link chamfered portion is offset toward a downstream side with respect to a chain-driving direction in the inner-link sprocket facing side in the state where the bicycle chain is engaged with the bicycle sprocket.

With the bicycle chain according to the eleventh aspect, it is possible to effectively improve the gear-holding performance of the bicycle chain.

In accordance with a twelfth aspect of the present invention, the bicycle chain according to any one of the above aspects is configured so that the at least one second inner-link chamfered portion is offset toward an upstream side with respect to the chain-driving direction in the inner-link sprocket facing side in the state where the bicycle chain is engaged with the bicycle sprocket.

With the bicycle chain according to the twelfth aspect, it is possible to effectively improve the shifting performance of the bicycle chain.

In accordance with a thirteenth aspect of the present invention, the bicycle chain according to any one of the above aspects is configured so that the first inner-link surface is configured to face an opposed inner link plate in a state where the bicycle chain is assembled.

With the bicycle chain according to the thirteenth aspect, it is possible to satisfy both of the gear-holding performance and the shifting performance of the inner link plate with achieving sufficient strength of the inner link plate.

In accordance with a fourteenth aspect of the present invention, a bicycle chain comprises a link plate. The link plate comprises a first end portion, a second end portion, an intermediate portion, at least one chamfered portion, and at least one further recessed portion. The first end portion includes a first opening having a first center axis. The second end portion includes a second opening having a second center axis. The intermediate portion interconnects the first end portion and the second end portion. The intermediate portion has a first connection end interconnected to the first end portion and a second connection end interconnected to the second end portion. The first end portion, the second end portion and the intermediate portion define an outer peripheral edge. The at least one chamfered portion is provided at least on the outer peripheral edge. The at least one further recessed portion provided in the at least one chamfered portion, the at least one further recessed portion being disposed in vicinity of at least one of the first connection end and the second connection end.

With the bicycle chain according to the fourteenth aspect, it is possible to satisfy at least one of gear-holding performance and shifting performance of the bicycle chain.

In accordance with a fifteenth aspect of the present invention, the bicycle chain according to any one of the above aspects is configured so that the at least one chamfered portion includes a plurality of chamfered portions each provided at least on the outer peripheral edge.

With the bicycle chain according to the fifteenth aspect, it is possible to arrange the plurality of chamfered portions symmetrically relative to a point. This can improve ease of assembly of the bicycle chain.

In accordance with a sixteenth aspect of the present invention, the bicycle chain according to any one of the above aspects is configured so that the link plate has a longitudinal centerline, a traverse centerline perpendicular to the longitudinal centerline, and a center point at which the longitudinal centerline and the traverse centerline intersect with each other. The plurality of chamfered portions are disposed symmetrically about the center point.

With the bicycle chain according to the sixteenth aspect, it is possible to further improve the ease of assembly of the bicycle chain.

In accordance with a seventeenth aspect of the present invention, the bicycle chain according to any one of the above aspects is configured so that the at least one further recessed portion is provided at one of the first connection end and the second connection end in one of the at least one chamfered portion. The other of the first connection end and the second connection end is free of another recessed portion in the one of the at least one chamfered portion.

With the bicycle chain according to the seventeenth aspect, it is possible to achieve sufficient strength of the bicycle chain.

In accordance with an eighteenth aspect of the present invention, the bicycle chain according to any one of the above aspects is configured so that the link plate has a longitudinal centerline, a sprocket facing side defined with respect to the longitudinal centerline, and a sprocket far side defined on an opposite side of the sprocket facing side with respect to the longitudinal centerline. The sprocket facing side is closer to a rotational center axis of a bicycle sprocket than the sprocket far side in a state where the bicycle chain is engaged with the bicycle sprocket. The at least one further recessed portion is offset toward an upstream side with respect to a chain-driving direction in the sprocket facing side.

With the bicycle chain according to the eighteenth aspect, it is possible to improve the gear-holding performance of the bicycle chain when a bicycle crank reversely rotates with respect to the chain-driving direction.

In accordance with a nineteenth aspect of the present invention, the bicycle chain according to any one of the above aspects is configured so that the link plate includes a first surface configured to face an opposed link plate in a state where the bicycle chain is assembled, and a second surface opposite to the first surface in an axial direction parallel to the first center axis. The at least one chamfered portion is provided in the first surface.

With the bicycle chain according to the nineteenth aspect, it is possible to further improve the gear-holding performance.

In accordance with a twentieth aspect of the present invention, the bicycle chain according to any one of the above aspects is configured so that the link plate includes an outer link plate.

With the bicycle chain according to the twentieth aspect, it is possible to effectively improve at least one of the gear-holding performance and the shifting performance of the outer link plate.

In accordance with a twenty-first aspect of the present invention, the bicycle chain according to any one of the above aspects is configured so that the link plate includes an inner link plate.

With the bicycle chain according to the twenty-first aspect, it is possible to effectively improve at least one of the gear-holding performance and the shifting performance of the inner link plate.

In accordance with a twenty-second aspect of the present invention, a bicycle chain comprises a link plate. The link plate comprises a first end portion, a second end portion, an intermediate portion, and at least one chamfered portion. The first end portion includes a first opening having a first center axis. The second end portion includes a second opening having a second center axis. The intermediate portion interconnects the first end portion and the second end portion. The first end portion, the second end portion and the intermediate portion define an outer peripheral edge. The at least one chamfered portion is provided at least on the outer peripheral edge. The at least one chamfered portion has a chamfered angle defined with respect to an axial direction parallel to the first center axis, the chamfered angle being larger than 0 degree and equal to or smaller than 45 degrees.

With the bicycle chain according to the twenty-second aspect, it is possible to effectively improve strength of the bicycle chain.

In accordance with a twenty-third aspect of the present invention, the bicycle chain according to any one of the above aspects is configured so that the link plate includes an outer link plate.

With the bicycle chain according to the twenty-third aspect, it is possible to effectively improve strength of the outer link plate.

In accordance with a twenty-fourth aspect of the present invention, the bicycle chain according to any one of the above aspects is configured so that the link plate includes an inner link plate.

With the bicycle chain according to the twenty-fourth aspect, it is possible to effectively improve strength of the inner link plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 49 is a cross sectional view of the outer link plate taken along line XLIX-XLIX of the FIG. 48.

FIG. 50 is a cross sectional view of the outer link plate taken along line L-L of the FIG. 48.

FIG. 51 is a cross sectional view of the outer link plate taken along line LI-LI of the FIG. 48.

DESCRIPTION OF THE EMBODIMENTS

Figure 1:
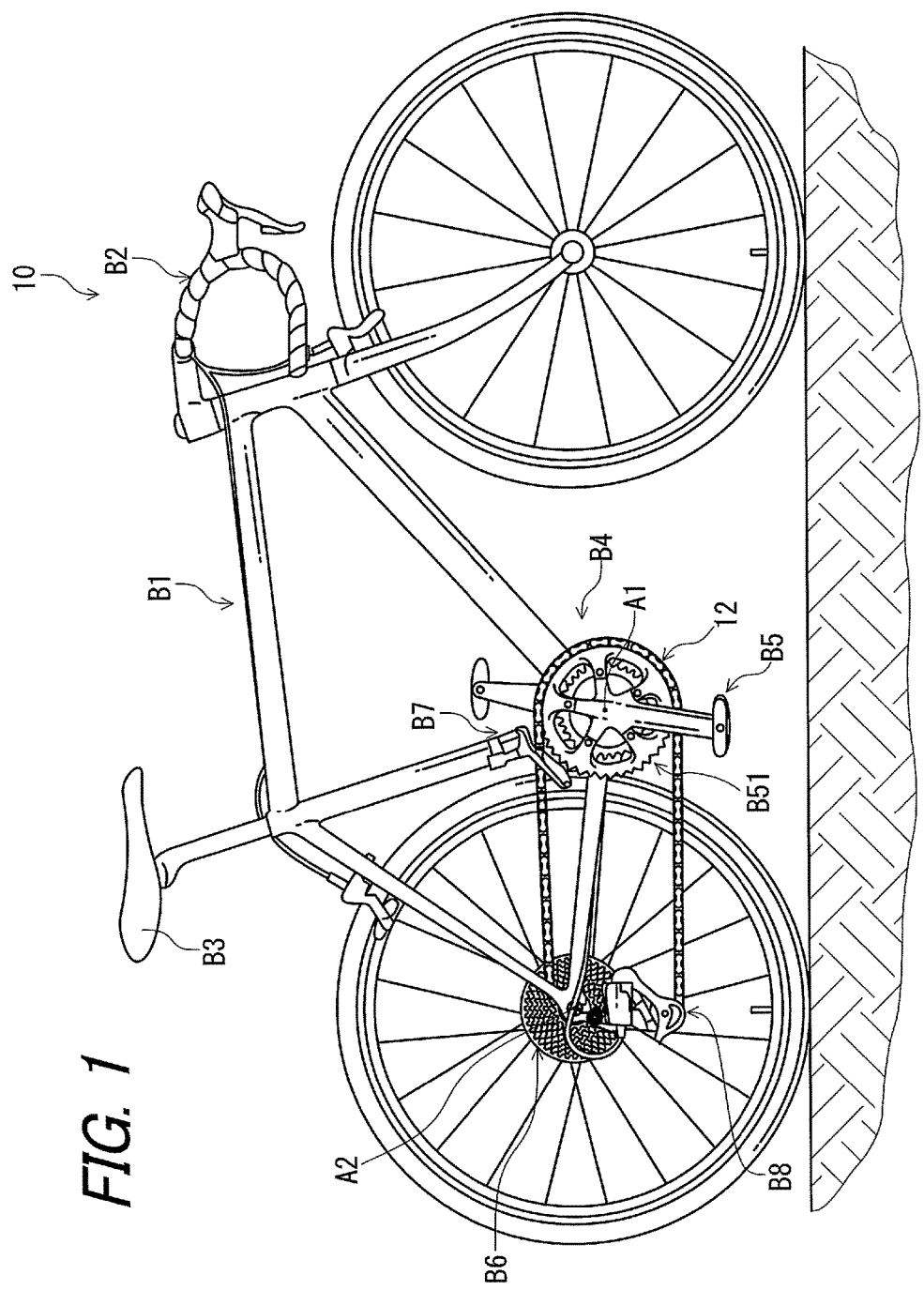
FIG. 1 is a side elevational view of a bicycle having a drive train that uses a bicycle chain in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 is illustrated to be equipped with a bicycle chain 12 in accordance with a first embodiment. The bicycle 10 includes a bicycle frame B1, a handlebar B2, a saddle B3, and a drive train B4. The drive train B4 is configured to convert the rider's pedaling force into driving force. The bicycle chain 12 is a part of the drive train B4. The drive train B4 also includes a bicycle crank B5, a rear sprocket B6, a front derailleur B7, and a rear derailleur B8. The bicycle crank B5 includes a front sprocket B51. The bicycle crank B5 is rotatably mounted on a bottom bracket of the bicycle frame B1 about a rotational center axis A1. The rear sprocket B6 is rotatably mounted to the bicycle frame B1 about a rotational center axis A2. The bicycle chain 12 is arranged on the front sprocket B51 and the rear sprocket B6 so as to extend therebetween. The front derailleur B7 and the rear derailleur B8 are configured and arranged to change gears by shifting the bicycle chain 12 in a transverse direction of the bicycle 10. The front sprocket B51 can also be referred to as a bicycle sprocket B51. The rear sprocket B6 can also be referred to as a bicycle sprocket B6.

In the present application, the following directional terms "front", "rear", "forward", "rearward", "left", "right", "transverse", "upward" and "downward" as well as any other similar directional terms refer to those directions which are determined on the basis of the rider who sits on the saddle B3 of the bicycle 10 with facing the handlebar B2, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12, should be interpreted relative to the bicycle chain 12 as mounted on the bicycle 10 used in an upright riding position on a horizontal surface as illustrated in FIG. 1.

Figure 2:
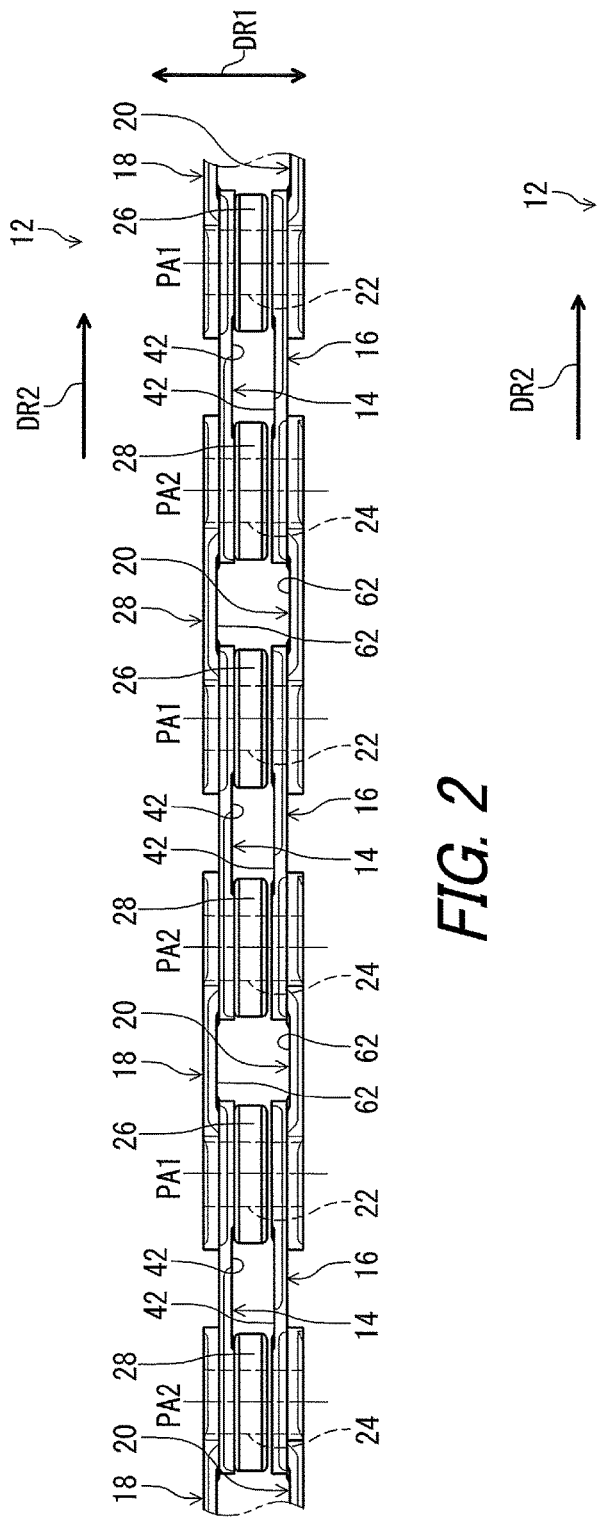
FIG. 2 is a partial plan view of the bicycle chain illustrated in FIG. 1.
Figure 3:
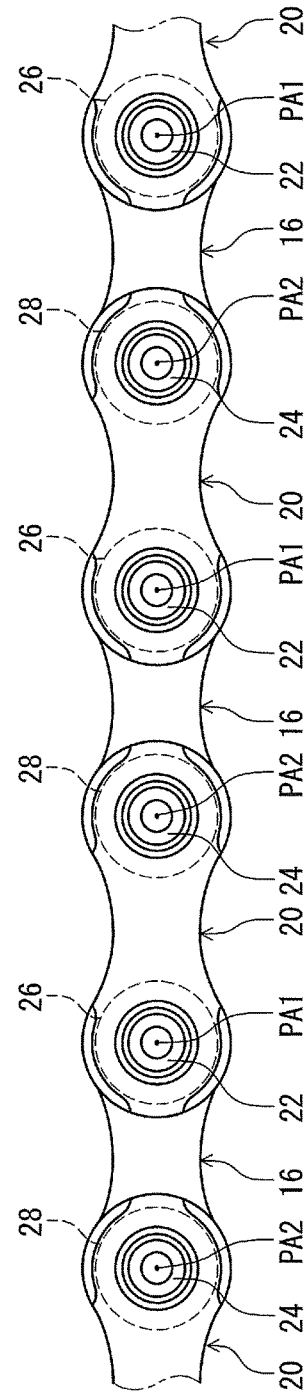
FIG. 3 is a partial side elevational view of the bicycle chain illustrated in FIG. 1.

Referring initially to FIGS. 2 and 3, the bicycle chain 12 comprises an inner link plate 14, an inner link plate 16, an outer link plate 18, and an outer link plate 20. In this embodiment, the bicycle chain 12 comprises a plurality of inner link plates 14, a plurality of inner link plates 16, a plurality of outer link plates 18, and a plurality of outer link plates 20. However, a total number of each of the inner link plates 14, the inner link plates 16, the outer link plates 18, and the outer link plates 20 is not limited to this embodiment.

Since the inner link plate 16 has the same structure as that of the inner link plate 14, the structure of the inner link plate 16 will not be described and/or illustrated in detail here for the sake of brevity. Since the outer link plate 20 has the same structure as that of the outer link plate 18, the structure of the outer link plate 20 will not be described and/or illustrated in detail here for the sake of brevity. The inner link plate 16 can have a structure different from that of the inner link plate 14. The outer link plate 20 can have a structure different from that of the outer link plate 18.

The bicycle chain 12 further comprises a first link pin 22, a second link pin 24, a first roller 26, and a second roller 28. An opposed pair of the inner link plate 14 and 16 are pivotally coupled to an opposed pair of the outer link plates 18 and 20 about a first pivot axis PA1 via the first link pin 22. The opposed pair of the inner link plate 14 and 16 are pivotally coupled to another opposed pair of the outer link plates 18 and 20 about a second pivot axis PA2 via the second link pin 24. The first link pin 22 defines the first pivot axis PA1. The second link pin 24 defines the second pivot axis PA2. The first roller 26 is rotatably mounted to the opposed pair of the inner link plates 14 and 16 about the first pivot axis PA1. The second roller 28 is rotatably mounted to the opposed pair of the inner link plates 14 and 16 about the second pivot axis PA2.

Figure 4:
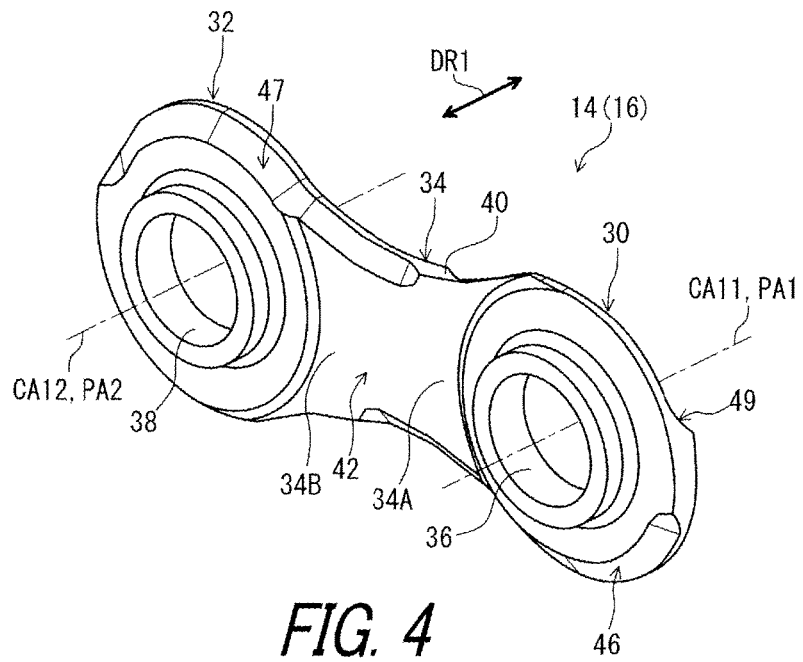
FIG. 4 is a perspective view of an inner link plate of the bicycle chain illustrated in FIG. 1.
Figure 5:
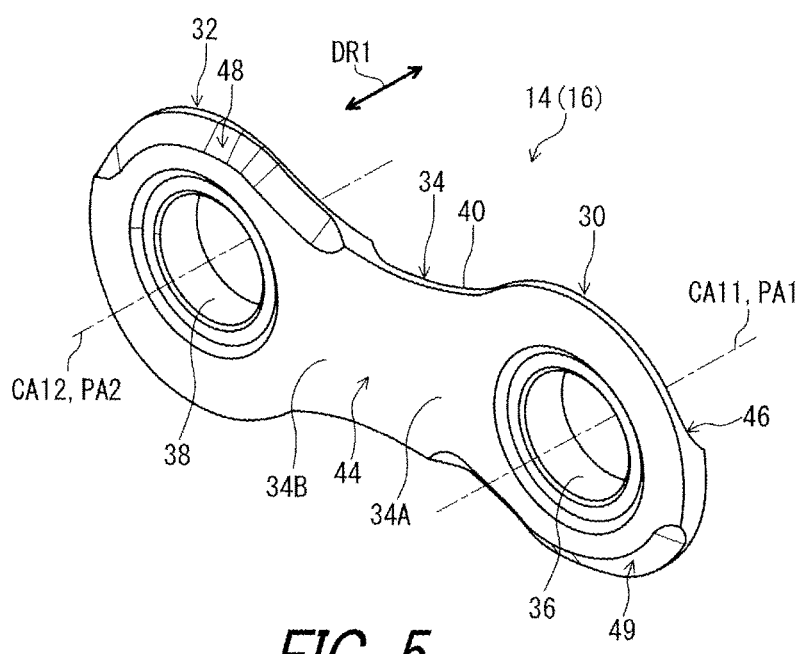
FIG. 5 is another perspective view of the inner link plate of the bicycle chain illustrated in FIG. 1.

As seen in FIGS. 4 and 5, the inner link plate 14 comprises a first inner-link end portion 30, a second inner-link end portion 32, and an inner-link intermediate portion 34. The first inner-link end portion 30 includes a first inner-link opening 36 having a first inner-link center axis CA11. The second inner-link end portion 32 includes a second inner-link opening 38 having a second inner-link center axis CA12. The first link pin 22 extends through the first inner-link opening 36. The second link pin 24 extends through the second inner-link opening 38. In the present application, the first inner-link end portion 30 can also be referred to as a first end portion 30, the second inner-link end portion 32 can also be referred to as a second end portion 32, and the inner-link intermediate portion 34 can also be referred to as an intermediate portion 34. Similarly, the first inner-link opening 36 can also be referred to as a first opening 36, and the second inner-link opening 38 can also be referred to as a second opening 38.

The inner-link intermediate portion 34 interconnects the first inner-link end portion 30 and the second inner-link end portion 32. The intermediate portion 34 has a first connection end 34A and a second connection end 34B. The first connection end 34A is interconnected to the first end portion 30. The second connection end 34B is interconnected to the second end portion 32. The first connection end 34A is opposite to the second connection end 34B. The first inner-link end portion 30, the second inner-link end portion 32 and the inner-link intermediate portion 34 defines an inner-link outer peripheral edge 40. The inner-link outer peripheral edge 40 can also be referred to as an outer peripheral edge 40. Namely, the first end portion 30, the second end portion 32 and the intermediate portion 34 define the outer peripheral edge 40. In this embodiment, the first inner-link center axis CA11 coincides with the first pivot axis PA1. The second inner-link center axis CA12 coincides with the second pivot axis PA2. However, the first inner-link center axis CA11 can be offset from the first pivot axis PA1. The second inner-link center axis CA12 can be offset from the second pivot axis PA2. In the present application, the first inner-link center axis CA11 can also be referred to as a first center axis CA11, and the second inner-link center axis CA12 can also be referred to as a second center axis CA12.

Figure 6:
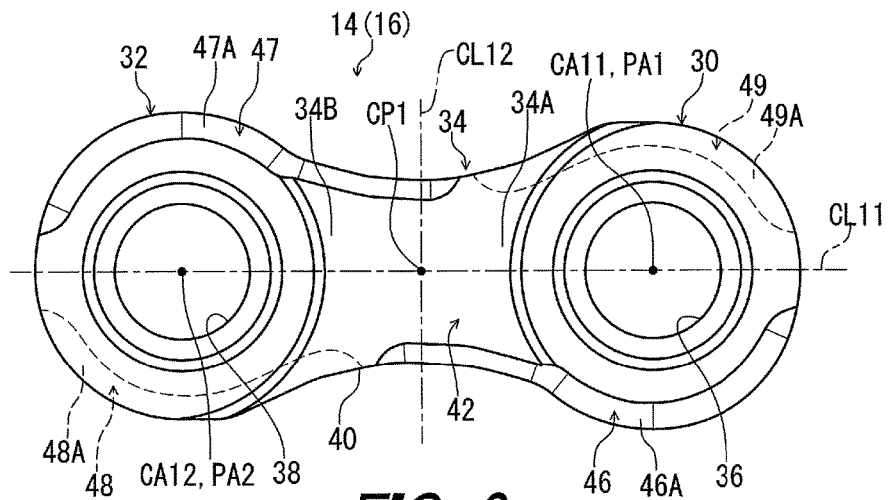
FIG. 6 is a side elevational view of the inner link plate of the bicycle chain illustrated in FIG. 1.
Figure 7:
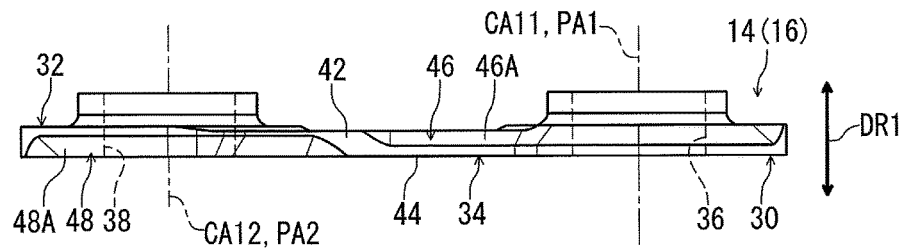
FIG. 7 is a bottom view of the inner link plate of the bicycle chain illustrated in FIG. 1.

As seen in FIGS. 4 to 8, the inner link plate 14 comprises a first inner-link surface 42 and a second inner-link surface 44. As seen in FIG. 7, the second inner-link surface 44 is opposite to the first inner-link surface 42 in an axial direction DR1 parallel to the first inner-link center axis CA11. The first inner-link surface 42 is configured to face an opposed inner link plate in a state where the bicycle chain 12 is assembled. In this embodiment, as seen in FIG. 2, the first inner-link surface 42 of the inner link plate 14 is configured to face the opposed inner link plate 16 in the state where the bicycle chain 12 is assembled. In the present application, the first inner-link surface 42 can also be referred to as a first surface 42, and the second inner-link surface 44 can also be referred to as a second surface 44.

As seen in FIGS. 4 and 6, the inner link plate 14 comprises at least one first inner-link chamfered portion 46 and/or 47. The at least one first inner-link chamfered portion 46 and/or 47 is provided at least on the inner-link outer peripheral edge 40 in the first inner-link surface 42. In this embodiment, the at least one first inner-link chamfered portion 46 and/or 47 includes a plurality of first inner-link chamfered portions 46 and 47 each provided at least on the inner-link outer peripheral edge 40 in the first inner-link surface 42. However, a total number of the at least one first inner-link chamfered portion 46 and/or 47 is not limited to this embodiment.

Figure 8:
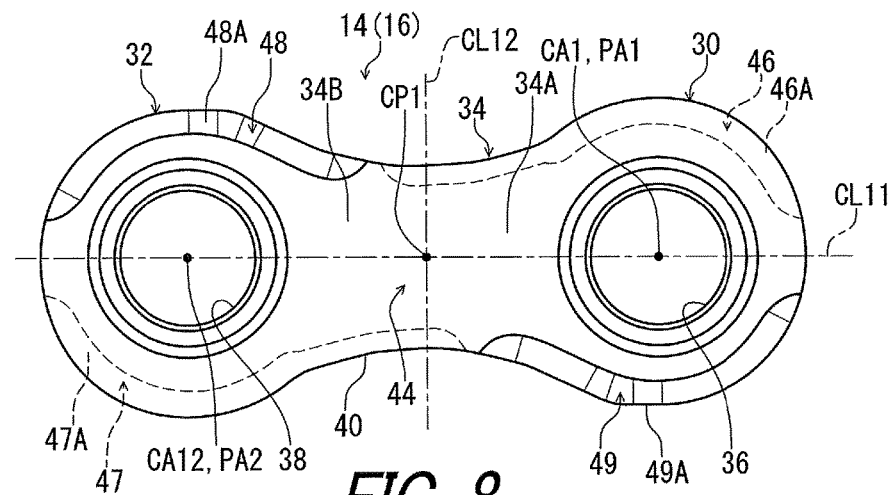
FIG. 8 is another side elevational view of the inner link plate of the bicycle chain illustrated in FIG. 1.

As seen in FIGS. 5 and 8, the inner link plate 14 comprises at least one second inner-link chamfered portion 48 and/or 49. The at least one second inner-link chamfered portion 48 and/or 49 is provided at least on the inner-link outer peripheral edge 40 in the second inner-link surface 44. In this embodiment, the at least one second inner-link chamfered portion 48 and/or 49 includes a plurality of second inner-link chamfered portions 48 and 49 each provided at least on the inner-link outer peripheral edge 40 in the second inner-link surface 44. However, a total number of the at least one second inner-link chamfered portion 48 and/or 49 is not limited to this embodiment.

As seen in FIG. 6, the at least one first inner-link chamfered portion 46 and/or 47 has a first non-overlapped portion with respect to the at least one second inner-link chamfered portion 48 and/or 49 when viewed from the axial direction DR1. In this embodiment, the first inner-link chamfered portion 46 has a first non-overlapped portion 46A with respect to the plurality of second inner-link chamfered portions 48 and 49 when viewed from the axial direction DR1. The first inner-link chamfered portion 47 has a first non-overlapped portion 47A with respect to the plurality of second inner-link chamfered portions 48 and 49 when viewed from the axial direction DR1. While the first inner-link chamfered portion 46 does not include a chamfered portion other than the first non-overlapped portion 46A in this embodiment, the first inner-link chamfered portion 46 can include a chamfered portion other than the first non-overlapped portion 46A. For example, the first inner-link chamfered portion 46 may partly include an overlapped portion that overlaps with the second inner-link chamfered portion 48 and/or 49 when viewed from the axial direction DR1. While the first inner-link chamfered portion 47 does not include a chamfered portion other than the first non-overlapped portion 47A in this embodiment, the first inner-link chamfered portion 47 can include a chamfered portion other than the first non-overlapped portion 47A. For example, the first inner-link chamfered portion 47 may partly include an overlapped portion that overlaps with the second inner-link chamfered portion 48 and/or 49 when viewed from the axial direction DR1.

As seen in FIG. 8, the at least one second inner-link chamfered portion 48 and/or 49 has a second non-overlapped portion with respect to the at least one first inner-link chamfered portion 46 and/or 47 when viewed from the axial direction DR1. In this embodiment, the second inner-link chamfered portion 48 has a second non-overlapped portion 48A with respect to the plurality of first inner-link chamfered portions 46 and 47 when viewed from the axial direction DR1. The second inner-link chamfered portion 49 has a second non-overlapped portion 49A with respect to the plurality of first inner-link chamfered portions 46 and 47 when viewed from the axial direction DR1. While the second inner-link chamfered portion 48 does not include a chamfered portion other than the second non-overlapped portion 48A in this embodiment, the second inner-link chamfered portion 48 can include a chamfered portion other than the second non-overlapped portion 48A. For example, the second inner-link chamfered portion 48 may partly include an overlapped portion that overlaps with the first inner-link chamfered portion 46 and/or 47 when viewed from the axial direction DR1. While the second inner-link chamfered portion 49 does not include a chamfered portion other than the second non-overlapped portion 49A in this embodiment, the second inner-link chamfered portion 49 can include a chamfered portion other than the second non-overlapped portion 49A. For example, the second inner-link chamfered portion 49 may partly include an overlapped portion that overlaps with the first inner-link chamfered portion 46 and/or 47 when viewed from the axial direction DR1.

As seen in FIG. 6, the at least one first inner-link chamfered portion 46 and/or 47 is disposed in the first inner-link surface 42 without overlapping with the at least one second inner-link chamfered portion 48 and/or 49 when viewed from the axial direction DR1. Each of the plurality of first inner-link chamfered portions 46 and 47 is disposed in the first inner-link surface 42 without overlapping with the plurality of second inner-link chamfered portions 48 and 49 when viewed from the axial direction DR1. The first non-overlapped portion 46A is disposed in the first inner-link surface 42 without overlapping with the plurality of second non-overlapped portions 48A and 49A when viewed from the axial direction DR1. The first non-overlapped portion 47A is disposed in the first inner-link surface 42 without overlapping with the plurality of second non-overlapped portions 48A and 49A when viewed from the axial direction DR1.

As seen in FIG. 8, the at least one second inner-link chamfered portion 48 and/or 49 is disposed in the second inner-link surface 44 without overlapping with the at least one first inner-link chamfered portion 46 and/or 47 when viewed from the axial direction DR1. Each of the plurality of second inner-link chamfered portions 48 and 49 is disposed in the second inner-link surface 44 without overlapping with the plurality of first inner-link chamfered portions 46 and 47 when viewed from the axial direction DR1. The second non-overlapped portion 48A is disposed in the second inner-link surface 44 without overlapping with the plurality of first non-overlapped portions 46A and 47A when viewed from the axial direction DR1. The second non-overlapped portion 49A is disposed in the second inner-link surface 44 without overlapping with the plurality of first non-overlapped portions 46A and 47A when viewed from the axial direction DR1.

Figure 9:
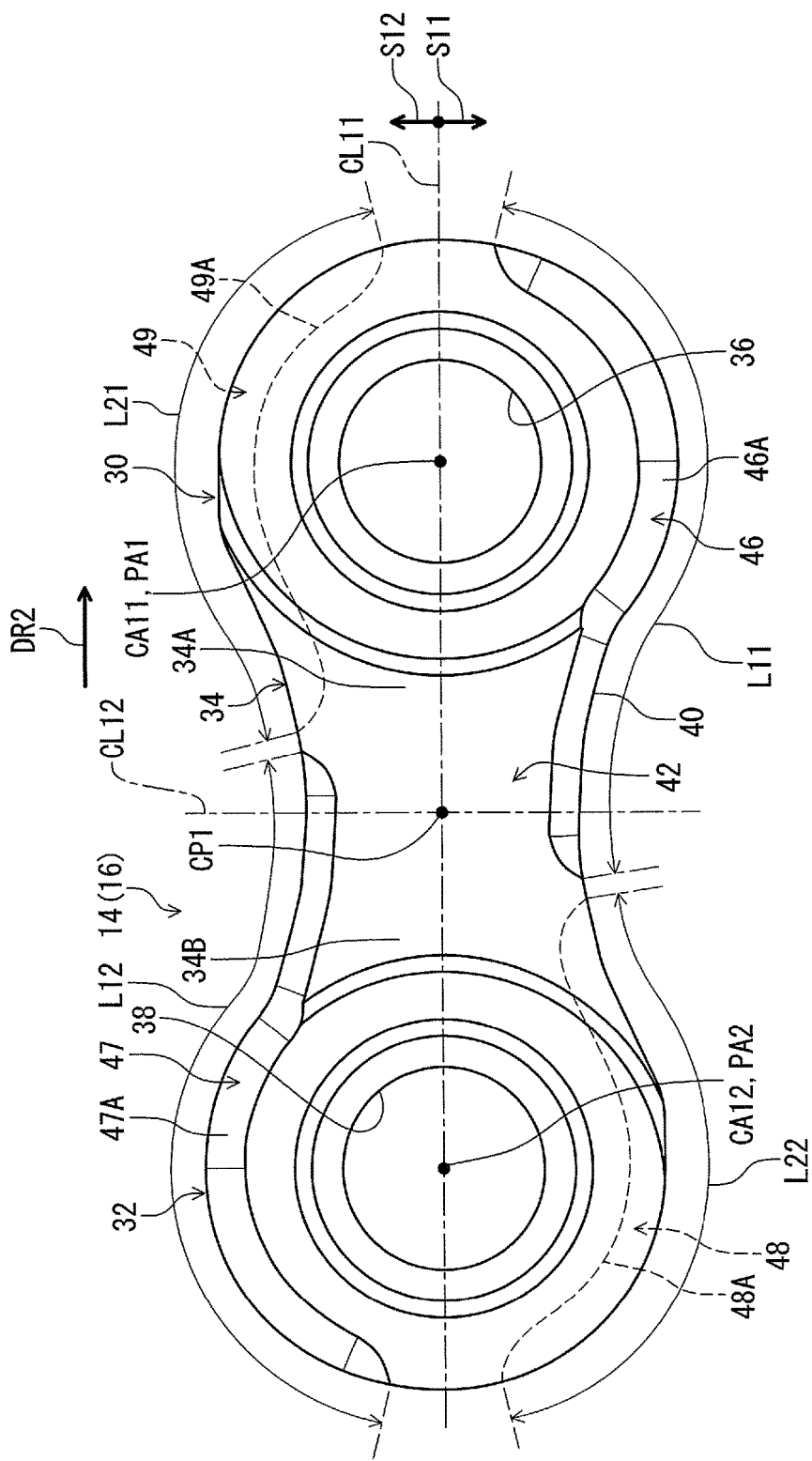
FIG. 9 is an enlarged side elevational view of the inner link plate of the bicycle chain illustrated in FIG. 1.

As seen in FIG. 9, the inner link plate 14 has an inner-link longitudinal centerline CL11 and an inner-link traverse centerline CL12. The inner-link traverse centerline CL12 is perpendicular to the inner-link longitudinal centerline CL11. In this embodiment, the inner-link longitudinal centerline CL11 intersects with each of the first inner-link center axis CA22 and the second inner-link center axis CA12 when viewed from the axial direction DR1. The inner-link traverse centerline CL12 is disposed at a center between the first inner-link center axis CA11 and the second inner-link center axis CA12 when viewed from the axial direction DR1. In the present application, the inner-link longitudinal centerline CL11 can also be referred to as a longitudinal centerline CL11, and the inner-link traverse centerline CL12 can also be referred to as a traverse centerline CL12 perpendicular to the longitudinal centerline CL11.

The inner link plate 14 has an inner-link center point CP1 at which the inner-link longitudinal centerline CL11 and the inner-link traverse centerline CL12 intersect with each other. In this embodiment, the inner-link center point CP1 is a center point defined between the first inner-link center axis CA11 and the second inner-link center axis CA12 when viewed from the axial direction DR1. The first connection end 34A is opposite to the second connection end 34B with respect to the inner-link center point CP1. In the present application, the inner-link center point CP1 can also be referred to as a center point CP1 at which the longitudinal centerline CL11 and the transverse centerline CL12 intersect with each other.

The plurality of first inner-link chamfered portions 46 and 47 are disposed symmetrically about the inner-link center point CP1. The plurality of second inner-link chamfered portions 48 and 49 are disposed symmetrically about the inner-link center point CP1. However, the plurality of first inner-link chamfered portions 46 and 47 can be disposed asymmetrically about the inner-link center point CP1. The plurality of second inner-link chamfered portions 48 and 49 can be disposed asymmetrically about the inner-link center point CP1. The plurality of first inner-link chamfered portions 46 and 47 can also be referred to as a plurality of chamfered portions 46 and 47. Thus, the plurality of chamfered portions 46 and 47 can be disposed symmetrically about the center point CP1. The plurality of second inner-link chamfered portions 48 and 49 can also be referred to as a plurality of chamfered portions 48 and 49. Thus, the plurality of chamfered portions 48 and 49 can be disposed symmetrically about the center point CP1.

As seen in FIGS. 6 and 8, the at least one first inner-link chamfered portion 46 and/or 47 is provided in one of the first inner-link end portion 30 and the second inner-link end portion 32. The at least one second inner-link chamfered portion 48 and/or 49 is provided in the other of the first inner-link end portion 30 and the second inner-link end portion 32.

In this embodiment, the plurality of first inner-link chamfered portions 46 and 47 are respectively provided in the first inner-link end portion 30 and the second inner-link end portion 32. The plurality of second inner-link chamfered portions 48 and 49 are respectively provided in the first inner-link end portion 30 and the second inner-link end portion 32. However, the arrangement of the at least one first inner-link chamfered portion 46 and/or 47 and the at least one second inner-link chamfered portion 48 and/or 49 is not limited to this embodiment. For example, the at least one first inner-link chamfered portion 46 and/or 47 can be provided in the first inner-link end portion 30, and the at least one second inner-link chamfered portion 48 and/or 49 can be provided in the first inner-link end portion 30. The at least one first inner-link chamfered portion 46 and/or 47 can be provided in the second inner-link end portion 32, and the at least one second inner-link chamfered portion 48 and/or 49 can be provided in the second inner-link end portion 32.

As seen in FIG. 9, the at least one first inner-link chamfered portion 46 and/or 47 is further provided in the inner-link intermediate portion 34. In this embodiment, the plurality of first inner-link chamfered portions 46 and 47 are further provided in the inner-link intermediate portion 34. The first inner-link chamfered portion 46 extends between the first end portion 30 and the intermediate portion 34 through the first connection end 34A. The first inner-link chamfered portion 47 extends between the second end portion 32 and the intermediate portion 34 through the second connection end 34B. However, the at least one first inner-link chamfered portion 46 and/or 47 can be omitted from the inner-link intermediate portion 34 according to need.

The at least one second inner-link chamfered portion 48 and/or 49 is further provided in the inner-link intermediate portion 34. In this embodiment, the plurality of second inner-link chamfered portions 48 and 49 are further provided in the inner-link intermediate portion 34. The second inner-link chamfered portion 48 extends between the second end portion 32 and the intermediate portion 34 through the second connection end 34B. The second inner-link chamfered portion 49 extends between the first end portion 30 and the intermediate portion 34 through the first connection end 34A. However, the at least one second inner-link chamfered portion 48 and/or 49 can be omitted from the inner-link intermediate portion 34 according to need.

As seen in FIG. 9, the at least one first inner-link chamfered portion 46 and/or 47 has a first inner-link chamfered length defined along the inner-link outer peripheral edge 40.

In this embodiment, the first inner-link chamfered portion 46 has a first inner-link chamfered length L11 defined along the inner-link outer peripheral edge 40. The first inner-link chamfered portion 47 has a first inner-link chamfered length L12 defined along the inner-link outer peripheral edge 40. The first inner-link chamfered length L11 is equal to the first inner-link chamfered length L12 in this embodiment. However, the first inner-link chamfered length L11 can be different from the first inner-link chamfered length L12.

The at least one second inner-link chamfered portion 48 and/or 49 has a second inner-link chamfered length defined along the inner-link outer peripheral edge 40. In this embodiment, the second inner-link chamfered portion 48 has a second inner-link chamfered length L21 defined along the inner-link outer peripheral edge 40. The second inner-link chamfered portion 49 has a second inner-link chamfered length L22 defined along the inner-link outer peripheral edge 40. The second inner-link chamfered length L21 is equal to the second inner-link chamfered length L22 in this embodiment. However, the second inner-link chamfered length L21 can be different from the second inner-link chamfered length L22.

The second inner-link chamfered length L21 is different from the first inner-link chamfered length L11. The second inner-link chamfered length L22 is different from the first inner-link chamfered length L11. The second inner-link chamfered length L21 is different from the first inner-link chamfered length L12. The second inner-link chamfered length L22 is different from the first inner-link chamfered length L12. In this embodiment, the first inner-link chamfered length L11 is larger than the second inner-link chamfered length L21. The first inner-link chamfered length L11 is larger than the second inner-link chamfered length L22. The first inner-link chamfered length L12 is larger than the second inner-link chamfered length L21. The first inner-link chamfered length L12 is larger than the second inner-link chamfered length L22. However, the first inner-link chamfered length L11 can be equal to or smaller than the second inner-link chamfered length L21. The first inner-link chamfered length L11 can be equal to or smaller than the second inner-link chamfered length L22. The first inner-link chamfered length L12 can be equal to or smaller than the second inner-link chamfered length L21. The first inner-link chamfered length L12 can be equal to or smaller than the second inner-link chamfered length L22.

The inner link plate 14 has an inner-link sprocket facing side S11 and an inner-link sprocket far side S12. The inner-link sprocket facing side S11 is defined with respect to the inner-link longitudinal centerline CL11. The inner-link sprocket far side S12 is defined on an opposite side of the inner-link sprocket facing side S11 with respect to the inner-link longitudinal centerline CL11. The inner-link sprocket facing side S11 is closer to the rotational center axis A1 or A2 (FIG. 1) of the bicycle sprocket B51 or B6 than the inner-link sprocket far side S12 in the state where the bicycle chain 12 is engaged with the bicycle sprocket B51 or B6. In the present application, the inner-link sprocket facing side S11 can also be referred to as a sprocket facing side S11, and the inner-link sprocket far side S12 can also be referred to as a sprocket far side S12.

As seen in FIG. 9, the at least one first inner-link chamfered portion 46 and/or 47 is offset toward a downstream side with respect to a chain-driving direction DR2 in the inner-link sprocket facing side S11 in the state where the bicycle chain 12 is engaged with the bicycle sprocket B51 or B6. The chain-driving direction DR2 is a direction in which the bicycle chain 12 moves during pedaling and is defined along the bicycle chain 12 in the state where the bicycle chain 12 is engaged with the bicycle sprocket B51 or B6.

In this embodiment, the first inner-link chamfered portion 46 is offset toward the downstream side with respect to the chain-driving direction DR2 in the inner-link sprocket facing side S11 in the state where the bicycle chain 12 is engaged with the bicycle sprocket B51 or B6. The first inner-link chamfered portion 47 is offset toward an upstream side with respect to the chain-driving direction DR2 in the inner-link sprocket far side S12 in the state where the bicycle chain 12 is engaged with the bicycle sprocket B51 or B6. However, the at least one first inner-link chamfered portion 46 and/or 47 can be disposed so as not to be offset toward the downstream side with respect to the chain-driving direction DR2 in the inner-link sprocket facing side S11 in the state where the bicycle chain 12 is engaged with the bicycle sprocket B51 or B6.

The at least one second inner-link chamfered portion 48 and/or 49 is offset toward the upstream side with respect to the chain-driving direction DR2 in the inner-link sprocket facing side S11 in the state where the bicycle chain 12 is engaged with the bicycle sprocket B51 or B6. In this embodiment, the second inner-link chamfered portion 48 is offset toward the upstream side with respect to the chain-driving direction DR2 in the inner-link sprocket facing side S11 in the state where the bicycle chain 12 is engaged with the bicycle sprocket B51 or B6. The second inner-link chamfered portion 49 is offset toward the downstream side with respect to the chain-driving direction DR2 in the inner-link sprocket far side S12 in the state where the bicycle chain 12 is engaged with the bicycle sprocket B51 or B6. However, the at least one second inner-link chamfered portion 48 and/or 49 can be disposed so as not to be offset toward the upstream side with respect to the chain-driving direction DR2 in the inner-link sprocket facing side S11 in the state where the bicycle chain 12 is engaged with the bicycle sprocket B51 or B6.

Figure 10:
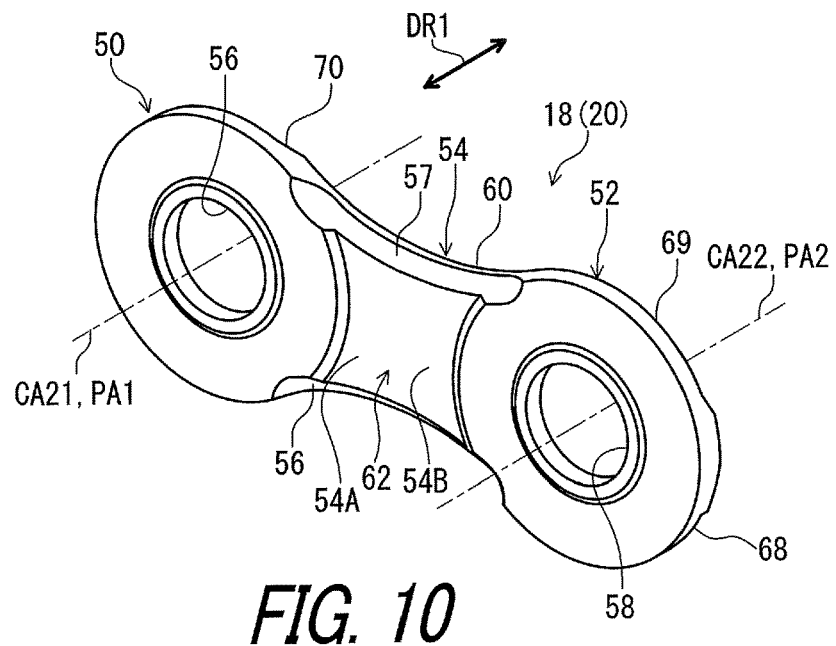
FIG. 10 is a perspective view of an outer link plate of the bicycle chain illustrated in FIG. 1.
Figure 11:
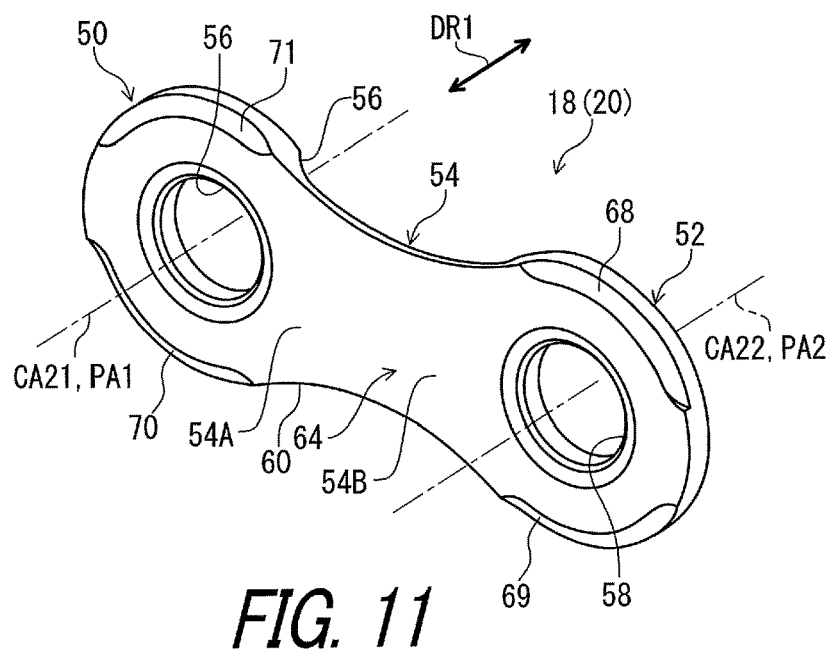
FIG. 11 is another perspective view of the outer link plate of the bicycle chain illustrated in FIG. 1.

As seen in FIGS. 10 and 11, the outer link plate 18 comprises a first outer-link end portion 50, a second outer-link end portion 52, and an outer-link intermediate portion 54. The first outer-link end portion 50 includes a first outer-link opening 56 having a first outer-link center axis CA21. The second outer-link end portion 52 includes a second outer-link opening 58 having a second outer-link center axis CA22. The first link pin 22 extends through the first outer-link opening 56. The second link pin 24 extends through the second outer-link opening 58. The first outer-link end portion 50 is pivotally coupled to the first inner-link end portion 30 via the first link pin 22 (FIGS. 2 and 3). The second outer-link end portion 52 is pivotally coupled to the second inner-link end portion 32 via the second link pin 24 (FIGS. 2 and 3). In the present application, the first outer-link end portion 50 can also be referred to as a first end portion 50, the second outer-link end portion 52 can also be referred to as a second end portion 52, and the outer-link intermediate portion 54 can also be referred to as an intermediate portion 54. Similarly, the first outer-link opening 56 can also be referred to as a first opening 56, and the second outer-link opening 58 can also be referred to as a second opening 58.

The outer-link intermediate portion 54 interconnects the first outer-link end portion 50 and the second outer-link end portion 52. The intermediate portion 54 has a first connection end 54A and a second connection end 54B. The first connection end 54A is interconnected to the first end portion 50. The second connection end 54B is interconnected to the second end portion 52. The first connection end 54A is opposite to the second connection end 54B. The first outer-link end portion 50, the second outer-link end portion 52 and the outer-link intermediate portion 54 defines an outer-link outer peripheral edge 60. The outer-link outer peripheral edge 60 can also be referred to as an outer peripheral edge 60. Namely, the first end portion 50, the second end portion 52 and the intermediate portion 54 define the outer peripheral edge 60. In this embodiment, the first outer-link center axis CA21 coincides with the first pivot axis PA1. The second outer-link center axis CA22 coincides with the second pivot axis PA2. However, the first outer-link center axis CA21 can be offset from the first pivot axis PA1. The second outer-link center axis CA22 can be offset from the second pivot axis PA2. In the present application, the first outer-link center axis CA21 can also be referred to as a first center axis CA21, and the second outer-link center axis CA22 can also be referred to as a second center axis CA22.

Figure 12:
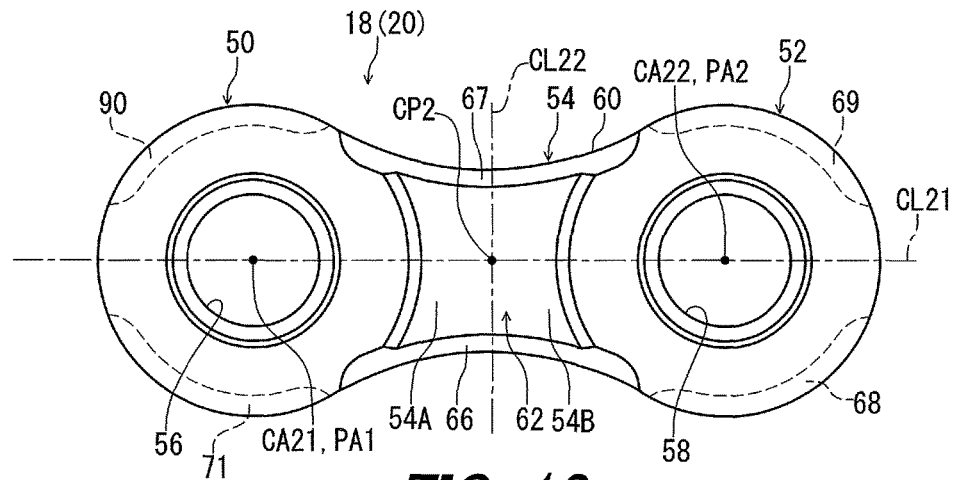
FIG. 12 is a side elevational view of the outer link plate of the bicycle chain illustrated in FIG. 1.
Figure 13:
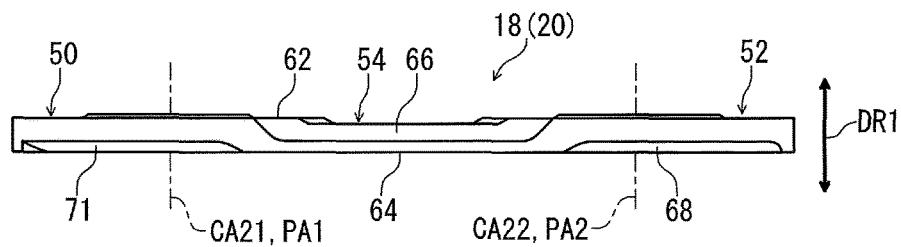
FIG. 13 is a bottom view of the outer link plate of the bicycle chain illustrated in FIG. 1.
Figure 14:
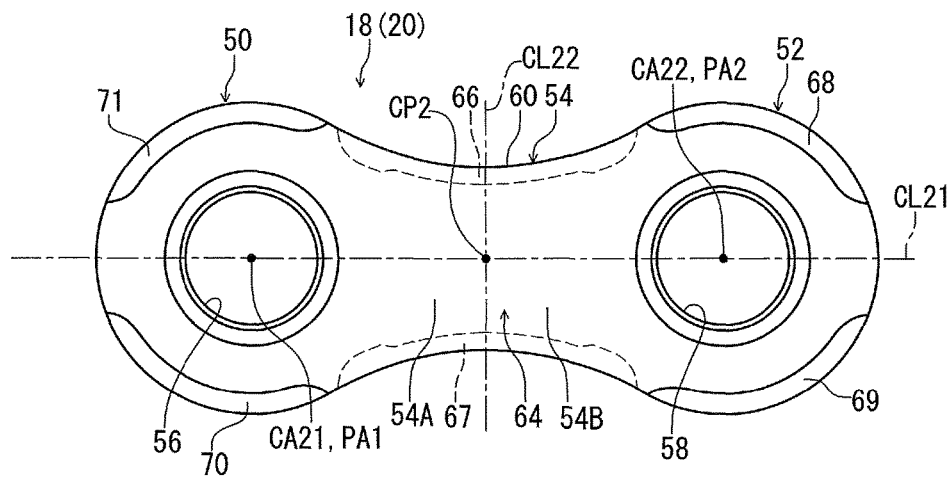
FIG. 14 is another side elevational view of the outer link plate of the bicycle chain illustrated in FIG. 1.

As seen in FIGS. 12 to 14, the outer link plate 18 comprises a first outer-link surface 62 and a second outer-link surface 64. The second outer-link surface 64 is opposite to the first outer-link surface 62 in an axial direction DR1 parallel to the first outer-link center axis CA21. The first outer-link surface 62 is configured to face an opposed outer-link plate in the state where the bicycle chain 12 is assembled. In this embodiment, the first outer-link surface 62 of the outer link plate 18 is configured to face the opposed outer link plate 20 in the state where the bicycle chain 12 is assembled. In the present application, the first outer-link surface 62 can also be referred to as a first surface 62, and the second outer-link surface 64 can also be referred to as a second surface 64.

As seen in FIGS. 10 and 12, the outer link plate 18 comprises at least one first outer-link chamfered portion 66 and/or 67. The at least one first outer-link chamfered portion 66 and/or 67 is provided at least on the outer-link outer peripheral edge 60 in the first outer-link surface 62. In this embodiment, the at least one first outer-link chamfered portion 66 and/or 67 includes a plurality of first outer-link chamfered portions 66 and 67 each provided at least on the outer-link outer peripheral edge 60 in the first outer-link surface 62. However, a total number of the at least one first outer-link chamfered portion 66 and/or 67 is not limited to this embodiment.

As seen in FIGS. 11 and 14, the outer link plate 18 comprises at least one second outer-link chamfered portion 68, 69, 70, and/or 71. The at least one second outer-link chamfered portion 68, 69, 70, and/or 71 is provided at least on the outer-link outer peripheral edge 60 in the second outer-link surface 64. In this embodiment, the at least one second outer-link chamfered portion 68, 69, 70, and/or 71 includes a plurality of second outer-link chamfered portions 68 to 71 each provided at least on the outer-link outer peripheral edge 60 in the second outer-link surface 64. However, a total number of the at least one second outer-link chamfered portion 68, 69, 70, and/or 71 is not limited to this embodiment.

The at least one second outer-link chamfered portion 68, 69, 70, and/or 71 is disposed in the second outer-link surface 64 without overlapping with the at least one first outer-link chamfered portion 66 and/or 67 when viewed from the axial direction DR1. Each of the plurality of second outer-link chamfered portions 68 to 71 is disposed in the second outer-link surface 64 without overlapping with the plurality of first outer-link chamfered portions 66 and 67 when viewed from the axial direction DR1. However, the at least one second outer-link chamfered portion 68, 69, 70, and/or 71 can be disposed in the second outer-link surface 64 to overlap with the at least one first outer-link chamfered portion 66 and/or 67 when viewed from the axial direction DR1.

As seen in FIGS. 12 and 14, the outer link plate 18 has an outer-link longitudinal centerline CL21 and an outer-link traverse centerline CL22. The outer-link traverse centerline CL22 is perpendicular to the outer-link longitudinal centerline CL21. In this embodiment, the outer-link longitudinal centerline CL21 intersects with each of the first outer-link center axis CA21 and the second outer-link center axis CA22 when viewed from the axial direction DR1. The outer-link traverse centerline CL22 is disposed at a center between the first outer-link center axis CA21 and the second outer-link center axis CA22 when viewed from the axial direction DR1. In the present application, the outer-link longitudinal centerline CL21 can also be referred to as a longitudinal centerline CL21, and the outer-link traverse centerline CL22 can also be referred to as a traverse centerline CL22 perpendicular to the longitudinal centerline CL21.

The outer link plate 18 has an outer-link center point CP2 at which the outer-link longitudinal centerline CL21 and the outer-link traverse centerline CL22 intersect with each other. In this embodiment, the outer-link center point CP2 is a center point defined between the first outer-link center axis CA21 and the second outer-link center axis CA22 when viewed from the axial direction DR1. The first connection end 54A is opposite to the second connection end 54B with respect to the outer-link center point CP2. In the present application, the outer-link center point CP2 can also be referred to as a center point CP2 at which the longitudinal centerline CL21 and the transverse centerline CL22 intersect with each other.

The plurality of first outer-link chamfered portions 66 and 67 are disposed symmetrically about the outer-link center point CP2. The plurality of second outer-link chamfered portions 68 to 71 are disposed symmetrically about the outer-link center point CP2. However, the plurality of first outer-link chamfered portions 66 and 67 can be disposed asymmetrically about the outer-link center point CP2. The plurality of second outer-link chamfered portions 68 to 71 can be disposed asymmetrically about the outer-link center point CP2. The plurality of first outer-link chamfered portions 66 and 67 can also be referred to as a plurality of chamfered portions 66 and 67. Thus, the plurality of chamfered portions 66 and 67 can be disposed symmetrically about the center point CP2. The plurality of second outer-link chamfered portions 68 to 71 can also be referred to as a plurality of chamfered portions 68 to 71. Thus, the plurality of chamfered portions 68 to 71 can be disposed symmetrically about the center point CP2.

As seen in FIGS. 12 and 14, the at least one first outer-link chamfered portion 66 and/or 67 is provided in at least one of the first outer-link end portion 50, the second outer-link end portion 52 and the outer-link intermediate portion 54. The at least one second outer-link chamfered portion 68, 69, 70, and/or 71 is provided in one of the first outer-link end portion 50 and the second outer-link end portion 52.

In this embodiment, the plurality of first outer-link chamfered portions 66 and 67 are respectively provided in the first outer-link end portion 50, the second outer-link end portion 52 and the outer-link intermediate portion 54. The plurality of second outer-link chamfered portions 68 and 69 are provided in the first outer-link end portion 50. The plurality of second outer-link chamfered portions 70 and 71 are provided in the second outer-link end portion 52. However, the arrangement of the at least one first outer-link chamfered portion 66 and/or 67 and the at least one second outer-link chamfered portion 68, 69, 70, and/or 71 is not limited to this embodiment.

The at least one first outer-link chamfered portion 66 and/or 67 is further provided in the outer-link intermediate portion 54. In this embodiment, the plurality of first outer-link chamfered portions 66 and 67 are further provided in the outer-link intermediate portion 54. Each of the first outer-link chamfered portions 66 and 67 extends between the first end portion 50 and the second end portion 52 through the intermediate portion 54. However, the at least one first outer-link chamfered portion 66 and/or 67 can be omitted from the outer-link intermediate portion 54 according to need.

Figure 15:
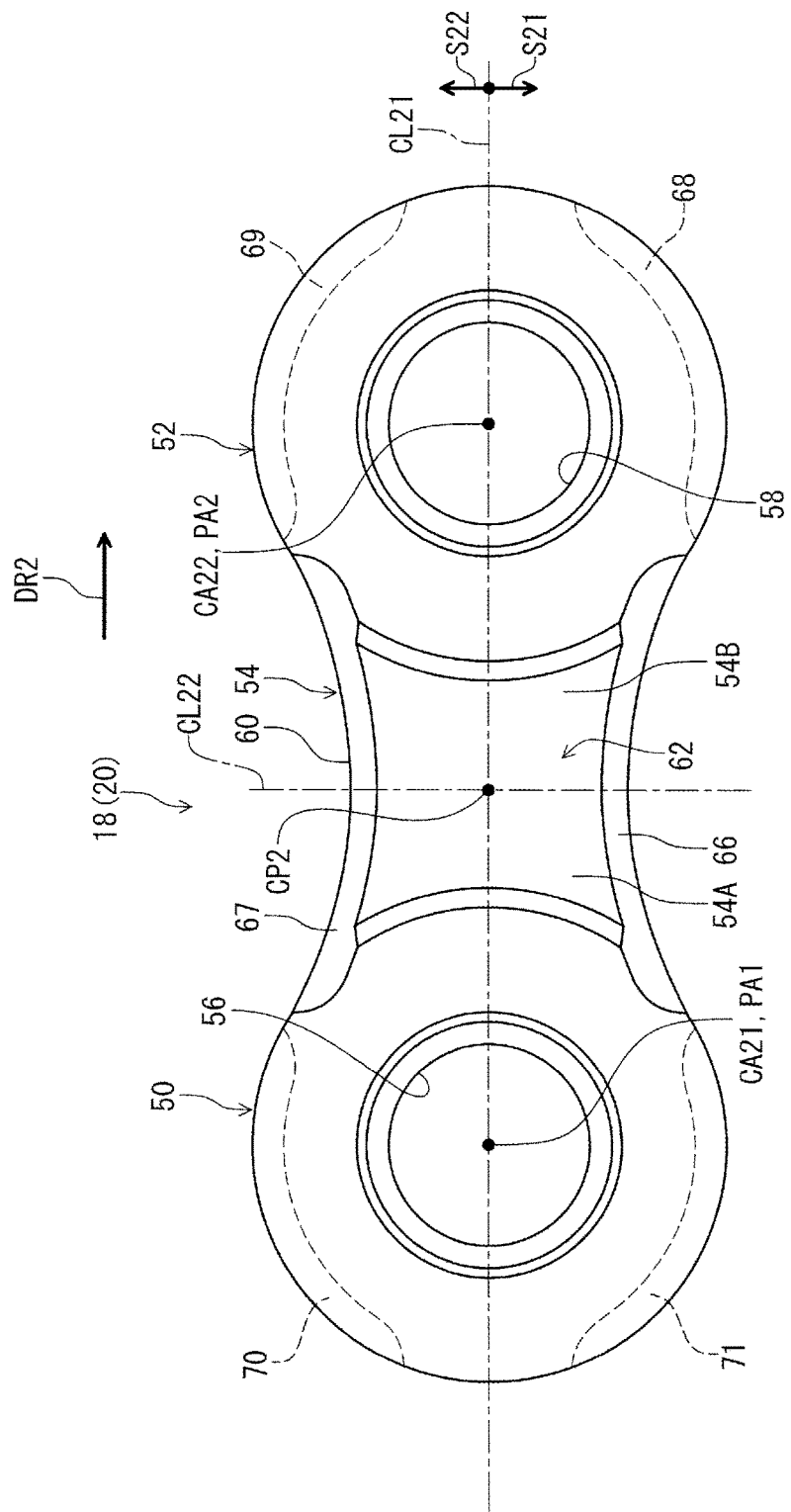
FIG. 15 is an enlarged side elevational view of the outer link plate of the bicycle chain illustrated in FIG. 1.

As seen in FIG. 15, the outer link plate 18 has an outer-link sprocket facing side S21 and an outer-link sprocket far side S22. The outer-link sprocket facing side S21 is defined with respect to the outer-link longitudinal centerline CL21. The outer-link sprocket far side S22 is defined on an opposite side of the outer-link sprocket facing side S21 with respect to the outer-link longitudinal centerline CL21. The outer-link sprocket facing side S21 is closer to a rotational center axis A1 or A2 (FIG. 1) of the bicycle sprocket B51 or B6 than the outer-link sprocket far side S22 in the state where the bicycle chain 12 is engaged with the bicycle sprocket B51 or B6. In the present application, the outer-link sprocket facing side S21 can also be referred to as a sprocket facing side S21, and the outer-link sprocket far side S22 can also be referred to as a sprocket far side S22.

Figure 16:
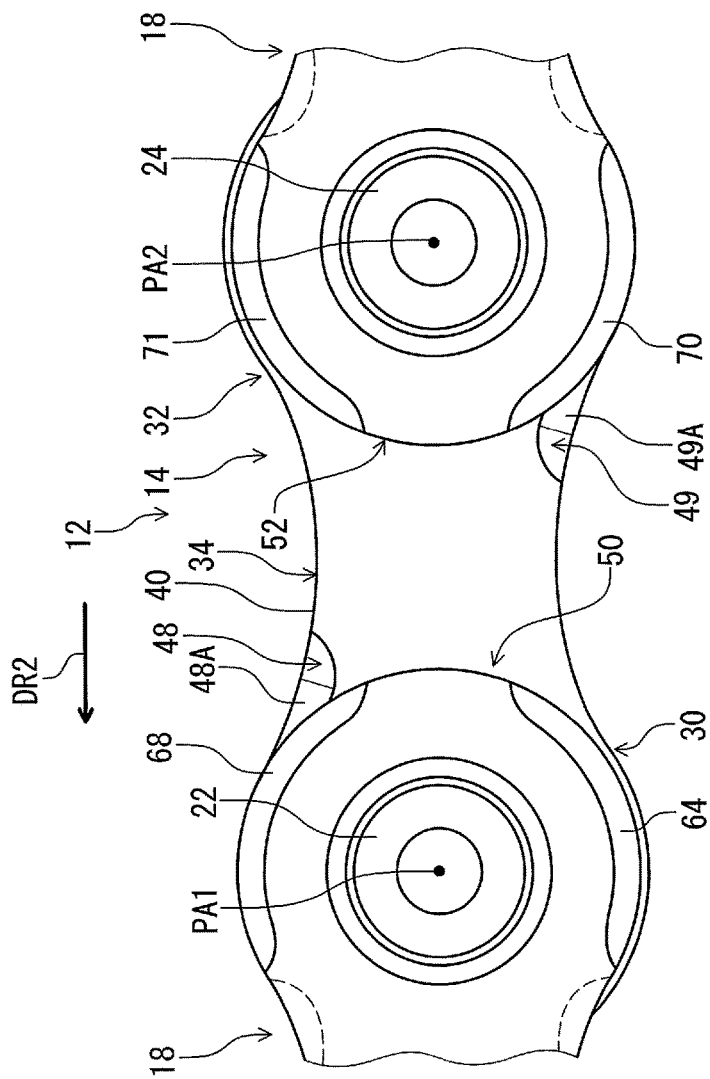
FIG. 16 is a partial enlarged side elevational view of the bicycle chain illustrated in FIG. 1.

As seen in FIG. 16, the second inner-link chamfered portion 48 of the inner link plate 14 extends along the inner-link outer peripheral edge 40 toward the second inner-link end portion 32 beyond the first outer-link end portion 50 of the outer link plate 18 in the state where the bicycle chain 12 is assembled. The second inner-link chamfered portion 49 of the inner link plate 14 extends along the inner-link outer peripheral edge 40 toward the first inner-link end portion 30 beyond the second outer-link end portion 52 of the outer link plate 18 in the state where the bicycle chain 12 is assembled.

The bicycle chain 12 includes the following features.

(1) The at least one first inner-link chamfered portion 46 and/or 47 has the first non-overlapped portion 46A and/or 47A with respect to the at least one second inner-link chamfered portion 48 and/or 49 when viewed from the axial direction DR1. The at least one second inner-link chamfered portion 48 and/or 49 has the second non-overlapped portion 48A and/or 49A with respect to the at least one first inner-link chamfered portion 46 and/or 47 when viewed from the axial direction DR1. Accordingly, it is possible to satisfy both of gear-holding performance and shifting performance of the bicycle chain 12 with achieving sufficient strength of the bicycle chain 12 by the at least one first inner-link chamfered portion 46 and/or 47 and the at least one second inner-link chamfered portion 48 and/or 49.

(2) The at least one second inner-link chamfered portion 48 and/or 49 is disposed in the second inner-link surface 44 without overlapping with the at least one first inner-link chamfered portion 46 and/or 47 when viewed from the axial direction DR1. Accordingly, it is possible to effectively achieve sufficient strength of the bicycle chain 12.

(3) The at least one first inner-link chamfered portion 46 and/or 47 includes the plurality of first inner-link chamfered portions 46 and 47 each provided at least on the inner-link outer peripheral edge 40 in the first inner-link surface 42. Accordingly, it is possible to arrange the plurality of first inner-link chamfered portions 46 and 47 symmetrically relative to a point. This can improve ease of assembly of the bicycle chain 12.

(4) The plurality of first inner-link chamfered portions 46 and 47 are disposed symmetrically about the inner-link center point CP1. Accordingly, it is possible to further improve the ease of assembly of the bicycle chain 12.

(5) The at least one second inner-link chamfered portion 48 and/or 49 includes the plurality of second inner-link chamfered portions 48 and 49 each provided at least on the inner-link outer peripheral edge 40 in the second inner-link surface 44. Accordingly, it is possible to arrange the plurality of second inner-link chamfered portions 48 and 49 symmetrically relative to a point. This can improve ease of assembly of the bicycle chain 12.

(6) The plurality of second inner-link chamfered portions 48 and 49 are disposed symmetrically about the inner-link center point CP1. Accordingly, it is possible to further improve the ease of assembly of the bicycle chain 12.

(7) The at least one first inner-link chamfered portion 46 and/or 47 is provided in one of the first inner-link end portion 30 and the second inner-link end portion 32. The at least one second inner-link chamfered portion 48 and/or 49 is provided in the other of the first inner-link end portion 30 and the second inner-link end portion 32. Accordingly, it is possible to easily arrange the at least one first inner-link chamfered portion 46 and/or 47 and the at least one second inner-link chamfered portion 48 and/or 49 so as not to overlap with each other when viewed from the axial direction DR1. This can effectively achieve sufficient strength of the bicycle chain 12.

(8) The at least one first inner-link chamfered portion 46 and/or 47 is further provided in the inner-link intermediate portion 34. Accordingly, it is possible to effectively improve at least one of the gear-holding performance and the shifting performance.

(9) The second inner-link chamfered length L21 or L22 is different from the first inner-link chamfered length L11 or L12. Accordingly, it is possible to easily arrange the at least one first inner-link chamfered portion 46 and/or 47 and the at least one second inner-link chamfered portion 48 and/or 49 so as not to overlap with each other when viewed from the axial direction DR1. This can effectively achieve sufficient strength of the bicycle chain 12 with improving the gear-holding performance and the shifting performance of the bicycle chain 12.

(10) The first inner-link chamfered length L11 or L12 is larger than the second inner-link chamfered length L21 or L22. Accordingly, it is possible to effectively improve at least one of the gear-holding performance and the shifting performance of the bicycle chain 12.

(11) The at least one first inner-link chamfered portion 46 and/or 47 is offset toward the downstream side with respect to the chain-driving direction DR2 in the inner-link sprocket facing side S11 in the state where the bicycle chain 12 is engaged with the bicycle sprocket. Accordingly, it is possible to effectively improve the gear-holding performance of the bicycle chain 12.

(12) The at least one second inner-link chamfered portion 48 and/or 49 is offset toward an upstream side with respect to the chain-driving direction DR2 in the inner-link sprocket facing side S11 in the state where the bicycle chain 12 is engaged with the bicycle sprocket. Accordingly, it is possible to effectively improve the shifting performance of the bicycle chain 12.

(13) The first inner-link surface 42 is configured to face an opposed inner link plate 16 in the state where the bicycle chain 12 is assembled. Accordingly, it is possible to satisfy both of the gear-holding performance and the shifting performance of the inner link plate 14 with achieving sufficient strength of the inner link plate 14.

Second Embodiment

A bicycle chain 212 in accordance with a second embodiment will be described below referring to FIGS. 17 to 31. The bicycle chain 212 has the same structure as that of the bicycle chain 12 except for the inner link plates 14 and 16 and the outer link plates 18 and 20. Thus, elements having substantially the same function as those in the first embodiment will be numbered the same here, and will not be described and/or illustrated again in detail here for the sake of brevity.

Figure 17:
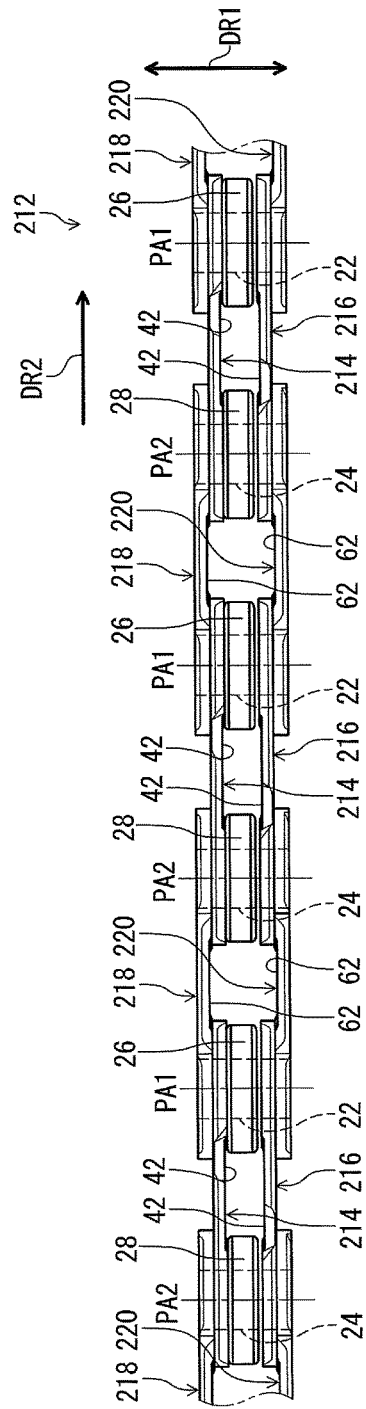
FIG. 17 is a partial plan view of a bicycle chain in accordance with a second embodiment.
Figure 18:
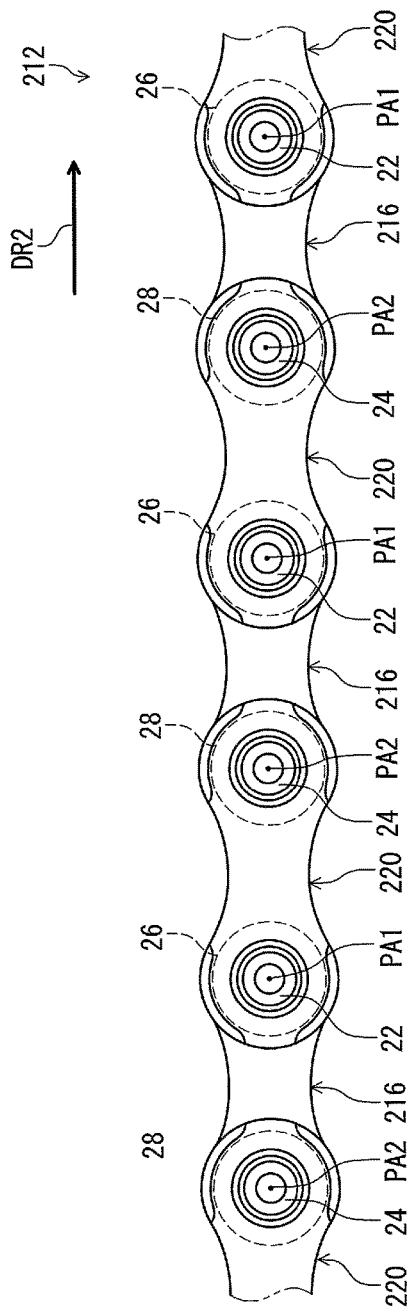
FIG. 18 is a partial side elevational view of the bicycle chain illustrated in FIG. 17.

As seen in FIGS. 17 and 18, the bicycle chain 212 comprises a link plate. The link plate includes an inner link plate. The link plate includes an outer link plate. In this embodiment, the bicycle chain 212 comprises an inner link plate 214, an inner link plate 216, an outer link plate 218, and an outer link plate 220. Specifically, the bicycle chain 212 comprises a plurality of inner link plates 214, a plurality of inner link plates 216, a plurality of outer link plates 218, and a plurality of outer link plates 220. The inner link plates 214 and 216 can also be referred to as link plates 214 and 216, respectively. The outer link plates 218 and 220 can also be referred to as link plates 218 and 220, respectively.

Since the link plate 216 has the same structure as that of the link plate 214, the structure of the link plate 216 will not be described and/or illustrated in detail here for the sake of brevity. Since the link plate 220 has the same structure as that of the link plate 218, the structure of the link plate 220 will not be described and/or illustrated in detail here for the sake of brevity. The link plate 216 can have a structure different from that of the link plate 214. The link plate 220 can have a structure different from that of the link plate 218.

Figure 19:
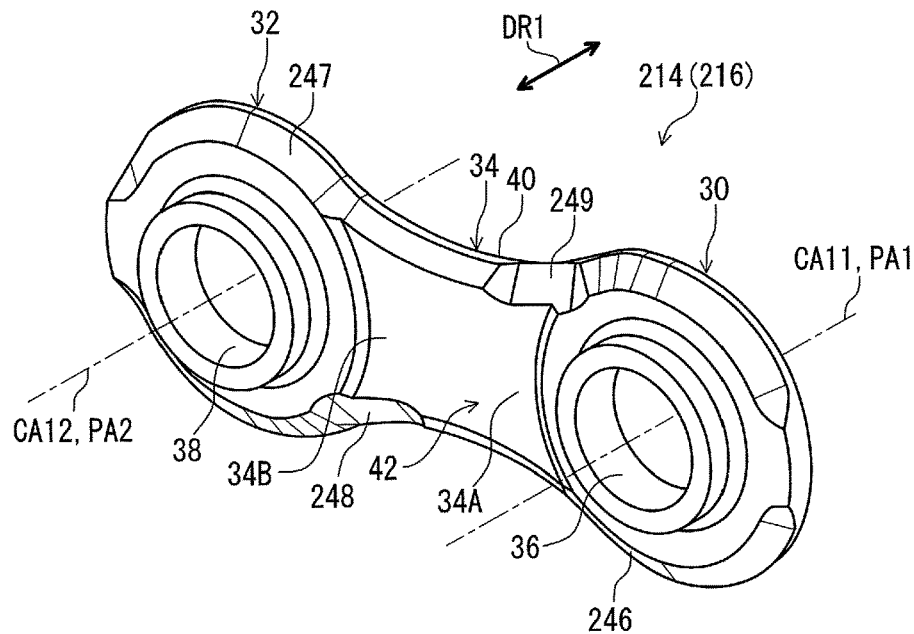
FIG. 19 is a perspective view of an inner link plate of the bicycle chain illustrated in FIG. 17.
Figure 20:
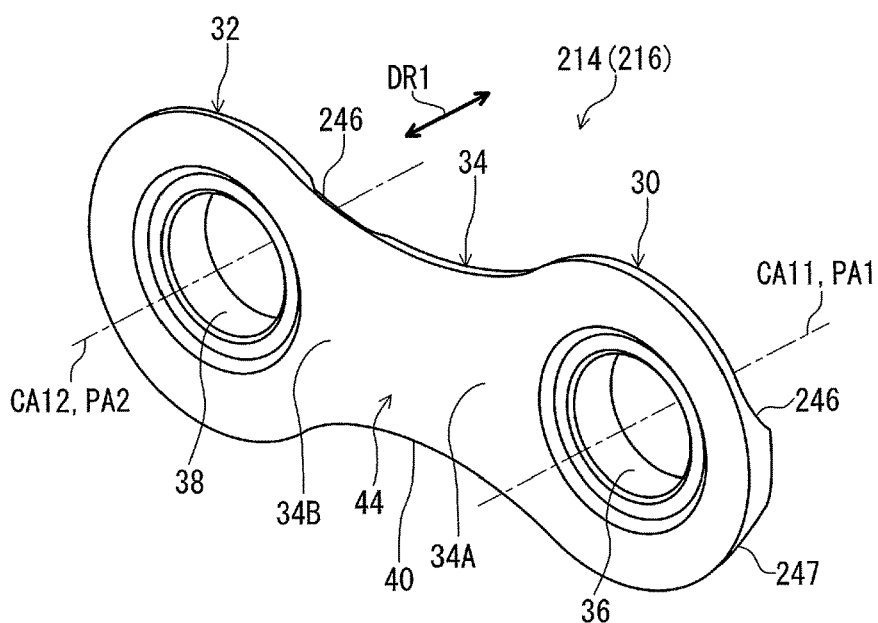
FIG. 20 is another perspective view of the inner link plate of the bicycle chain illustrated in FIG. 17.

As seen in FIGS. 19 and 20, the link plate 214 comprises the first end portion 30, the second end portion 32, and the intermediate portion 34. The intermediate portion 34 interconnects the first end portion 30 and the second end portion 32. The intermediate portion 34 has the first connection end 34A and the second connection end 34B. The first connection end 34A is interconnected to the first end portion 30. The second connection end 34B is interconnected to the second end portion 32. The first end portion 30, the second end portion 32 and the intermediate portion 34 define an outer peripheral edge 40. The link plate 214 has substantially the same structure as that of the inner link plate 14 of the first embodiment.

Figure 21:
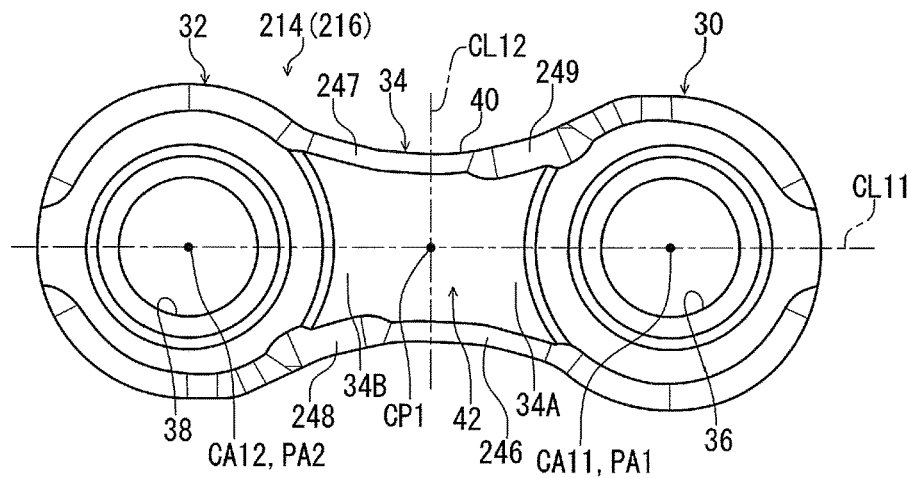
FIG. 21 is a side elevational view of the inner link plate of the bicycle chain illustrated in FIG. 17.
Figure 22:
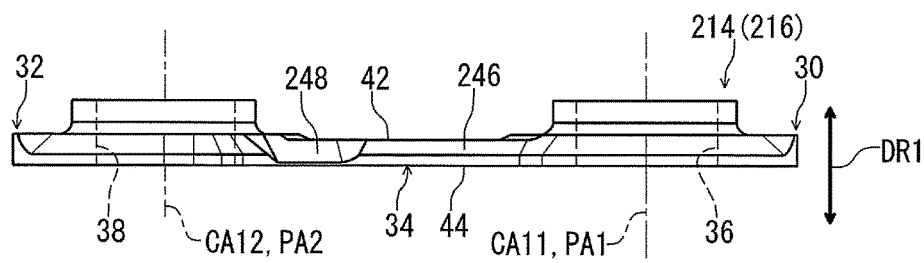
FIG. 22 is a bottom view of the inner link plate of the bicycle chain illustrated in FIG. 17.
Figure 23:
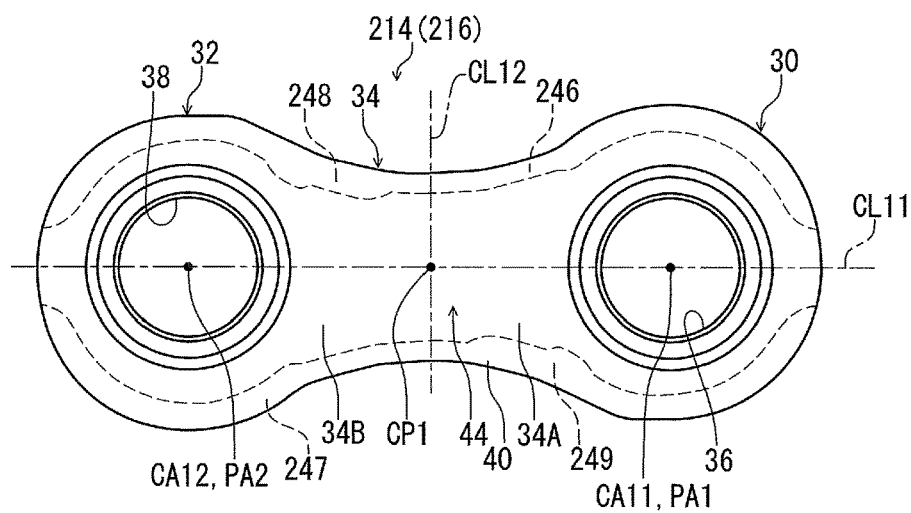
FIG. 23 is another side elevational view of the inner link plate of the bicycle chain illustrated in FIG. 17.

As seen in FIGS. 21 to 23, however, the link plate 214 comprises at least one chamfered portion 246 and/or 247 provided at least on the outer peripheral edge 40. The link plate 214 includes a first surface 42 and a second surface 44. The first surface 42 is configured to face an opposed link plate in the state where the bicycle chain 212 is assembled. The second surface 44 is opposite to the first surface 42 in the axial direction DR1 parallel to the first center axis CA11. The at least one chamfered portion 246 and/or 247 is provided in the first surface 42. In this embodiment, the at least one chamfered portion 246 and/or 247 includes a plurality of chamfered portions 246 and 247 each provided at least on the outer peripheral edge 40. The plurality of chamfered portions 246 and 247 are provided in the first surface 42. A total number of the at least one chamfered portion 246 and/or 247 is not limited to this embodiment.

As seen in FIG. 23, the link plate 214 does not comprise a chamfered portion in the second surface 44. However, the link plate 214 can comprise a chamfered portion in the second surface 44.

As seen in FIG. 21, the link plate 214 comprises at least one further recessed portion 248 and/or 249. The at least one further recessed portion 248 and/or 249 is provided in the at least one chamfered portion 246 and/or 247. The at least one further recessed portion 248 and/or 249 is disposed in vicinity of at least one of the first connection end 34A and the second connection end 34B. In this embodiment, the at least one further recessed portion 248 and/or 249 includes a plurality of further recessed portions 248 and 249 respectively provided in the plurality of chamfered portions 246 and 247. The plurality of further recessed portions 248 and 249 are respectively disposed in vicinity of the first connection end 34A and the second connection end 34B. However, a total number of the at least one further recessed portion 248 and/or 249 is not limited to this embodiment.

The at least one further recessed portion 248 and/or 249 is provided at one of the first connection end 34A and the second connection end 34B in one of the at least one chamfered portion 246 and/or 247. The other of the first connection end 34A and the second connection end 34B is free of another recessed portion in the one of the at least one chamfered portion 246 and/or 247. In this embodiment, the further recessed portion 248 is provided at the second connection end 34B in the chamfered portion 246. The first connection end 34A is free of another recessed portion in the chamfered portion 246. The further recessed portion 249 is provided at the first connection end 34A in the chamfered portion 247. The second connection end 34B is free of another recessed portion in the chamfered portion 247. The further recessed portion 248 can extend between the second end portion 32 and the intermediate portion 34 through the second connection end 34B in the chamfered portion 246. The further recessed portion 249 can extend between the first end portion 30 and the intermediate portion 34 through the first connection end 34A in the chamfered portion 247.

Figure 24:
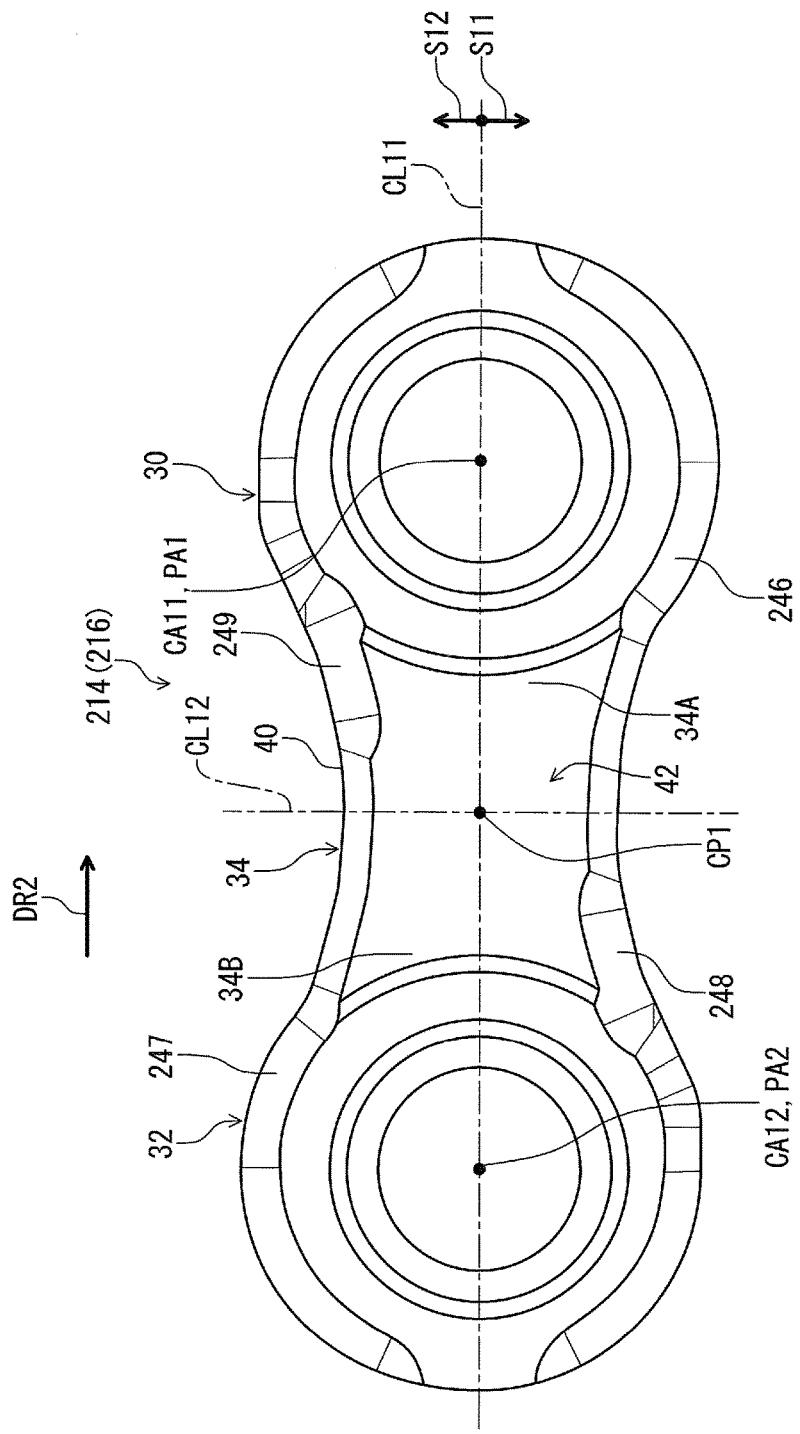
FIG. 24 is an enlarged side elevational view of the inner link plate of the bicycle chain illustrated in FIG. 17.

As seen in FIG. 24, the plurality of chamfered portions 246 and 247 are disposed symmetrically about the center point CP1. The plurality of further recessed portion 248 and 249 are disposed symmetrically about the center point CP1. However, the plurality of chamfered portions 246 and 247 can be disposed asymmetrically about the center point CP1. The plurality of further recessed portion 248 and 249 can be disposed asymmetrically about the center point CP1.

The link plate 214 has a sprocket facing side S11 and a sprocket far side S12. The sprocket facing side S11 is defined with respect to the longitudinal centerline CL11. The sprocket far side S12 is defined on an opposite side of the sprocket facing side S11 with respect to the longitudinal centerline CL11. The sprocket facing side S11 is closer to the rotational center axis A1 or A2 (FIG. 1) of the bicycle sprocket B51 or B6 than the sprocket far side S12 in the state where the bicycle chain 212 is engaged with the bicycle sprocket B51 or B6. The at least one further recessed portion 248 is offset toward an upstream side with respect to the chain-driving direction DR2 in the sprocket facing side S11. The at least one further recessed portion 249 is offset toward an upstream side with respect to the chain-driving direction DR2 in the sprocket facing side S11 if the bicycle chain 212 is mounted to the bicycle 10 so that the chamfered portion 247 is disposed in the sprocket facing side S11. In this embodiment, the further recessed portion 248 of the link plate 214 is offset toward the upstream side with respect to the chain-driving direction DR2 in the sprocket facing side S11. The further recessed portion 249 of the link plate 214 is offset toward the downstream side with respect to the chain-driving direction DR2 in the sprocket far side S12.

Figure 25:
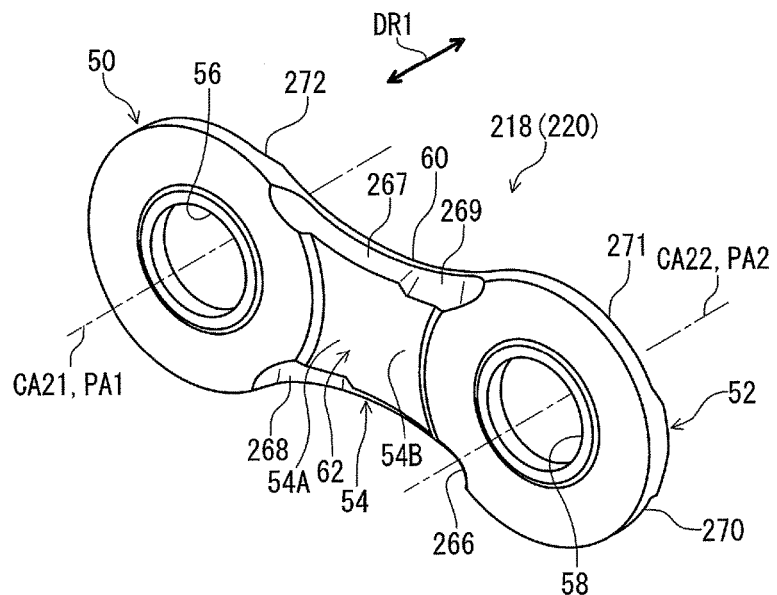
FIG. 25 is a perspective view of an outer link plate of the bicycle chain illustrated in FIG. 17.
Figure 26:
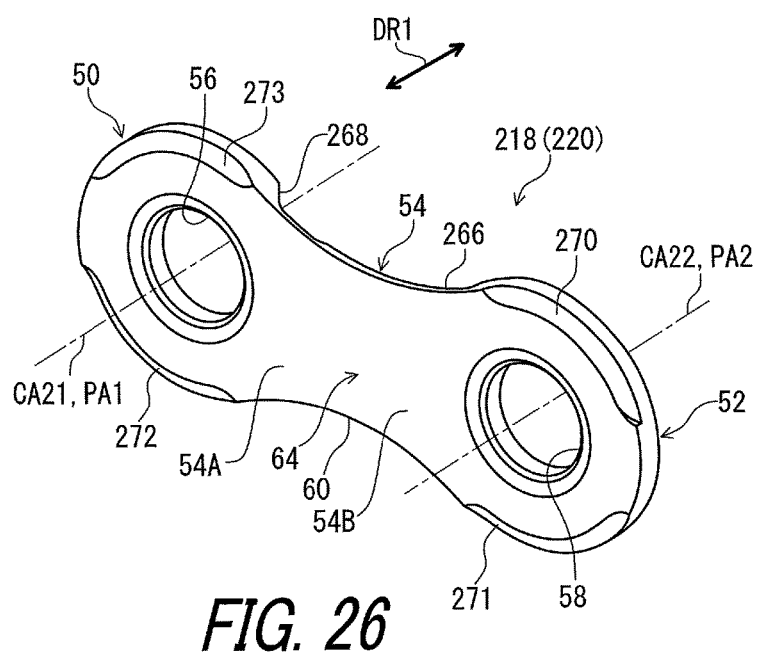
FIG. 26 is another perspective view of the outer link plate of the bicycle chain illustrated in FIG. 17.

As seen in FIGS. 25 and 26, the link plate 218 comprises the first end portion 50, the second end portion 52, and the intermediate portion 54. The intermediate portion 54 interconnects the first end portion 50 and the second end portion 52. The intermediate portion 54 has the first connection end 54A and the second connection end 54B. The first connection end 54A is interconnected to the first end portion 50. The second connection end 54B is interconnected to the second end portion 52. The first end portion 50, the second end portion 52 and the intermediate portion 54 define an outer peripheral edge 60. The link plate 218 has substantially the same structure as that of the outer link plate 18 of the first embodiment.

Figure 27:
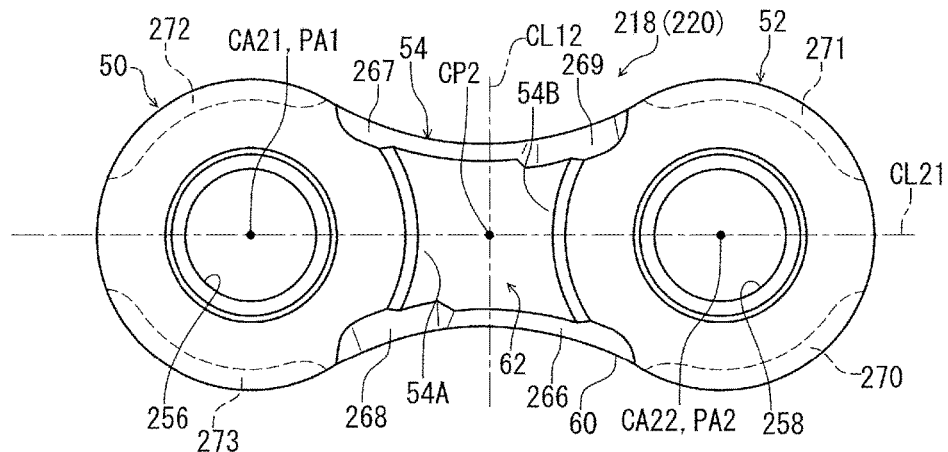
FIG. 27 is a side elevational view of the outer link plate of the bicycle chain illustrated in FIG. 17.
Figure 28:
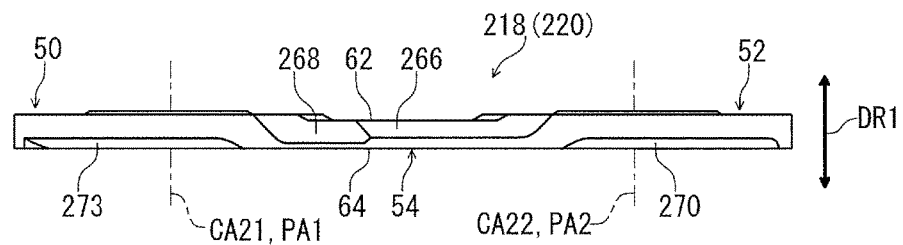
FIG. 28 is a bottom view of the outer link plate of the bicycle chain illustrated in FIG. 17.

As seen in FIG. 27, however, the link plate 218 comprises at least one chamfered portion 266 and/or 267 provided at least on the outer peripheral edge 60. The link plate 218 includes a first surface 62 and a second surface 64. The first surface 62 is configured to face an opposed link plate in the state where the bicycle chain 212 is assembled. The second surface 64 is opposite to the first surface 62 in the axial direction DR1 parallel to the first center axis CA21. The at least one chamfered portion 266 and/or 267 is provided in the first surface 62. In this embodiment, the at least one chamfered portion 266 and/or 267 includes a plurality of chamfered portions 266 and 267 each provided at least on the outer peripheral edge 60. The plurality of chamfered portions 266 and 267 are provided in the first surface 62. A total number of the at least one chamfered portion 266 and/or 267 is not limited to this embodiment.

The link plate 218 comprises at least one further recessed portion 268 and/or 269. The at least one further recessed portion 268 and/or 269 is provided in the at least one chamfered portion 266 and/or 267. The at least one further recessed portion 268 and/or 269 is disposed in vicinity of at least one of the first connection end 54A and the second connection end 54B. In this embodiment, the at least one further recessed portion 268 and/or 269 includes a plurality of further recessed portions 268 and 269 respectively provided in the plurality of chamfered portions 266 and 267. The plurality of further recessed portions 268 and 269 are respectively disposed in vicinity of the first connection end 54A and the second connection end 54B. However, a total number of the at least one further recessed portion 268 and/or 269 is not limited to this embodiment.

Figure 29:
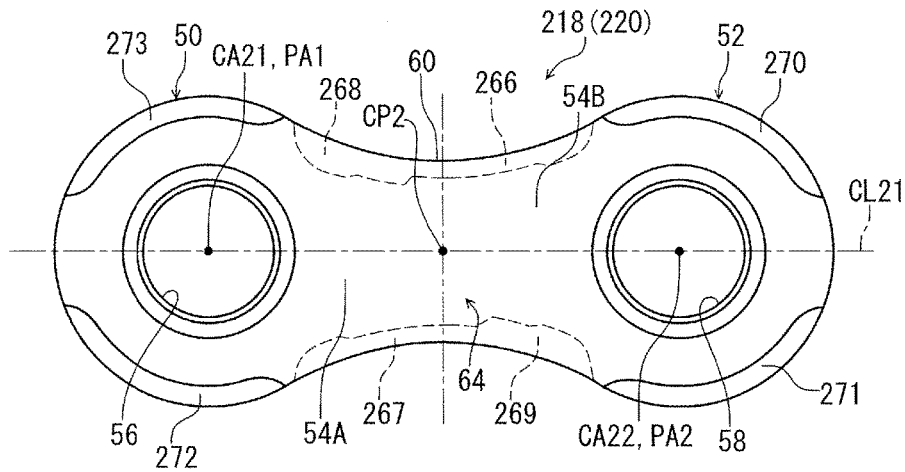
FIG. 29 is another side elevational view of the outer link plate of the bicycle chain illustrated in FIG. 17.

As seen in FIG. 29, the link plate 218 comprises at least one additional chamfered portion 270, 271, 272, and/or 273. The at least one additional chamfered portion 270, 271, 272, and/or 273 is provided at least on the outer peripheral edge 60 in the second surface 64. In this embodiment, the at least one additional chamfered portion 270, 271, 272, and/or 273 includes a plurality of additional chamfered portions 270 to 273 each provided at least on the outer peripheral edge 60 in the second surface 64. However, a total number of the at least one additional chamfered portion 270, 271, 272, and/or 273 is not limited to this embodiment.

The at least one further recessed portion 268 and/or 269 is provided at one of the first connection end 54A and the second connection end 54B in one of the at least one chamfered portion 266 and/or 267. The other of the first connection end 54A and the second connection end 54B is free of another recessed portion in the one of the at least one chamfered portion 266 and/or 267. In this embodiment, the further recessed portion 268 is provided at the first connection end 54A in the chamfered portion 266. The second connection end 54B is free of another recessed portion in the chamfered portion 266. The further recessed portion 269 is provided at the second connection end 54B in the chamfered portion 267. The first connection end 54A is free of another recessed portion in the chamfered portion 267. The further recessed portion 268 can extend between the first end portion 50 and the intermediate portion 54 through the first connection end 54A in the chamfered portion 266. The further recessed portion 269 can extend between the second end portion 52 and the intermediate portion 54 through the second connection end 54B in the chamfered portion 267.

Figure 30:
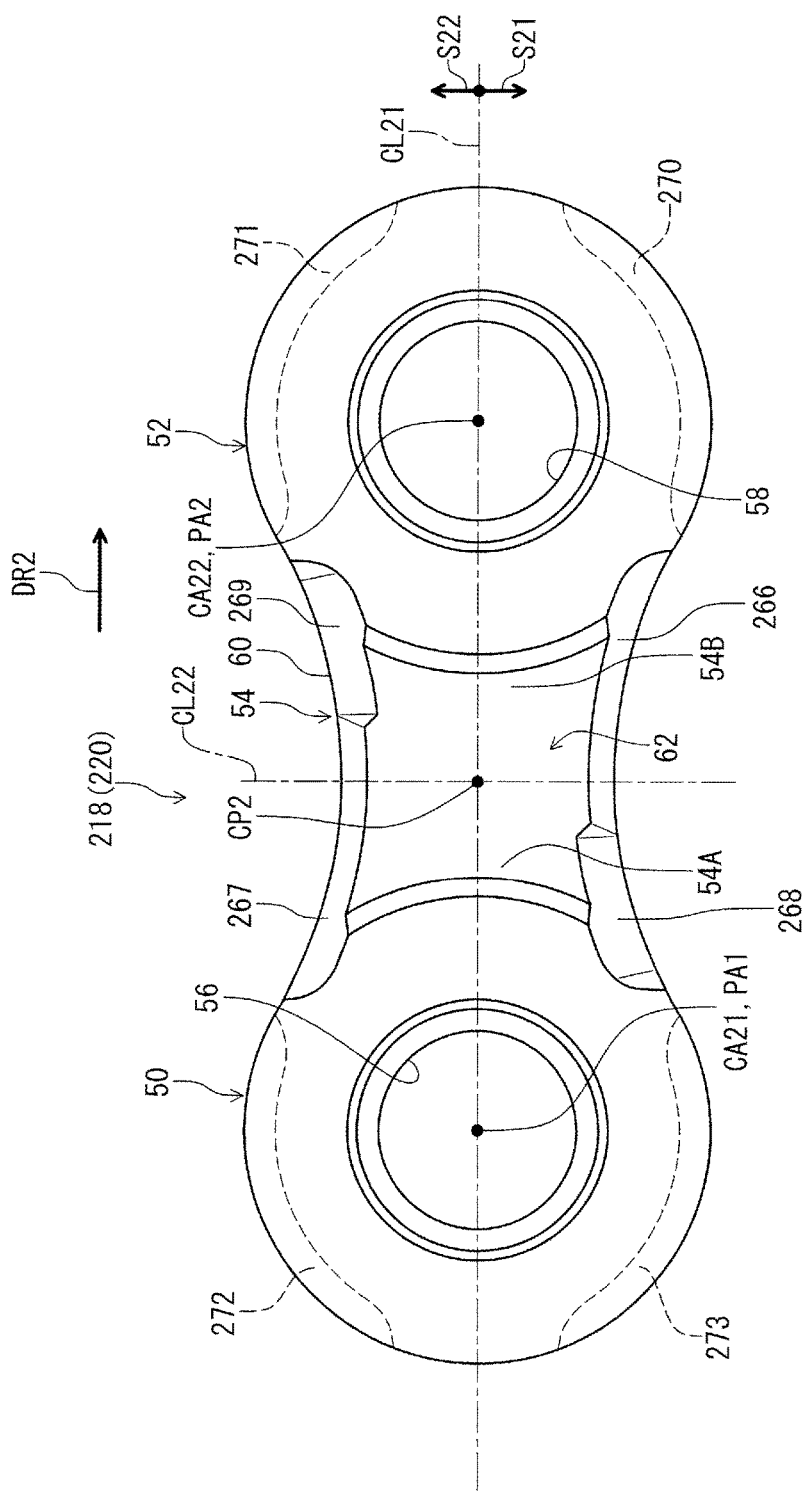
FIG. 30 is an enlarged side elevational view of the outer link plate of the bicycle chain illustrated in FIG. 17.

As seen in FIG. 30, the plurality of chamfered portions 266 and 267 are disposed symmetrically about the center point CP2. The plurality of further recessed portion 268 and 269 are disposed symmetrically about the center point CP2. However, the plurality of chamfered portions 266 and 267 can be disposed asymmetrically about the center point CP2. The plurality of further recessed portion 268 and 269 can be disposed asymmetrically about the center point CP2.

The link plate 218 has a sprocket facing side S21 and a sprocket far side S22. The sprocket facing side S21 is defined with respect to the longitudinal centerline CL21. The sprocket far side S22 is defined on an opposite side of the sprocket facing side S21 with respect to the longitudinal centerline CL21. The sprocket facing side S21 is closer to the rotational center axis A1 or A2 (FIG. 1) of the bicycle sprocket B51 or B6 than the sprocket far side S22 in the state where the bicycle chain 212 is engaged with the bicycle sprocket B51 or B6. The at least one further recessed portion 268 is offset toward the upstream side with respect to the chain-driving direction DR2 in the sprocket facing side S21. The at least one further recessed portion 269 is offset toward an upstream side with respect to the chain-driving direction DR2 in the sprocket facing side S21 if the bicycle chain 212 is mounted to the bicycle 10 so that the chamfered portion 267 is disposed in the sprocket facing side S21. In this embodiment, the further recessed portion 268 of the link plate 218 is offset toward the upstream side with respect to the chain-driving direction DR2 in the sprocket facing side S21. The further recessed portion 269 of the link plate 218 is offset toward the downstream side with respect to the chain-driving direction DR2 in the sprocket far side S22.

The bicycle chain 212 includes the following features.

(1) The at least one chamfered portion 246 and/or 247 is provided at least on the outer peripheral edge 40. The at least one further recessed portion 248 and/or 249 is provided in the at least one chamfered portion 246 and/or 247. The at least one further recessed portion 248 and/or 249 is disposed in vicinity of at least one of the first connection end 34A and the second connection end 34B. Accordingly, it is possible to satisfy at least one of gear-holding performance and shifting performance of the bicycle chain 212.

(2) The at least one chamfered portion 246 and/or 247 includes the plurality of chamfered portions 246 and 247 each provided at least on the outer peripheral edge 40. Accordingly, it is possible to arrange the plurality of chamfered portions 246 and 247 symmetrically relative to a point. This can improve ease of assembly of the bicycle chain 212.

(3) The plurality of chamfered portions 246 and 247 are disposed symmetrically about the center point CP1. Accordingly, it is possible to further improve the ease of assembly of the bicycle chain 212.

(4) The at least one further recessed portion 248 and/or 249 is provided at one of the first connection end 34A and the second connection end 34B in one of the at least one chamfered portion 246 and/or 247. The other of the first connection end 34A and the second connection end 34B is free of another recessed portion in the one of the at least one chamfered portion 246 and/or 247. Accordingly, it is possible to achieve sufficient strength of the bicycle chain 212.

Figure 31:
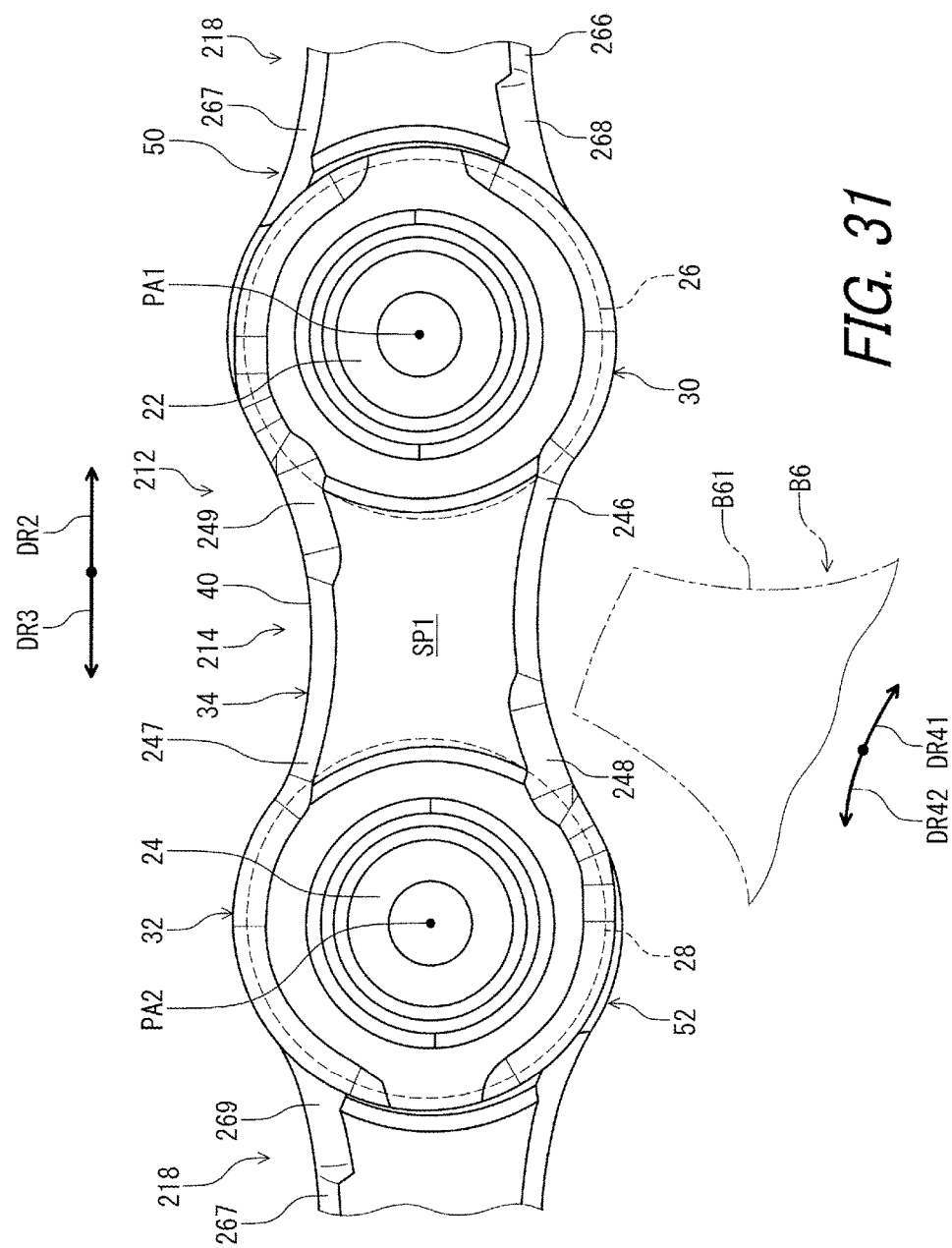
FIG. 31 is a partial enlarged side elevational view of the bicycle chain illustrated in FIG. 17.

(5) The at least one further recessed portion 248 and/or 249 is offset toward the upstream side with respect to the chain-driving direction DR2 in the sprocket facing side S11. Accordingly, it is possible to improve the gear-holding performance of the bicycle chain 212 when the bicycle crank B5 (FIG. 1) is reversely rotated with respect to the chain-driving direction. For example, as seen in FIG. 31, the bicycle sprocket B6 is rotated in a driving rotational direction DR41 when the bicycle chain 212 is moved in the chain-driving direction DR2 during pedaling. The bicycle sprocket B6 is rotated in a reversing rotational direction DR42 when the bicycle chain 212 is moved in a chain-reversing direction DR3 in response to a reverse rotation of the bicycle crank B5 (FIG. 1). The chain-reversing direction DR3 is defined along the bicycle chain 212 to be opposite to the chain-driving direction DR2. The chain-reversing direction DR3 is opposite to the chain-driving direction DR2. The further recessed portion 248 allows a sprocket tooth B61 of the bicycle sprocket B6 to be smoothly returned (inserted) to a space SP1 disposed between the opposed pair of link plates 214 and 216 when the bicycle sprocket B6 is rotated in the reversing rotational direction DR42. This can improve the gear-holding performance of the bicycle chain 212 when the bicycle crank B5 (FIG. 1) is reversely rotated with respect to the chain-driving direction.

(6) The at least one chamfered portion 246 and/or 247 is provided in the first surface 42. Accordingly, it is possible to further improve the gear-holding performance.

(7) The at least one chamfered portion 266 and/or 267 is provided at least on the outer peripheral edge 60. The at least one further recessed portion 268 and/or 269 is provided in the at least one chamfered portion 266 and/or 267. The at least one further recessed portion 268 and/or 269 is disposed in vicinity of at least one of the first connection end 54A and the second connection end 54B. Accordingly, it is possible to satisfy at least one of gear-holding performance and shifting performance of the bicycle chain 212.

(8) The at least one chamfered portion 266 and/or 267 includes the plurality of chamfered portions 266 and 267 each provided at least on the outer peripheral edge 60. Accordingly, it is possible to arrange the plurality of chamfered portions 266 and 267 symmetrically relative to a point. This can improve ease of assembly of the bicycle chain 212.

(9) The plurality of chamfered portions 266 and 267 are disposed symmetrically about the center point CP1. Accordingly, it is possible to further improve the ease of assembly of the bicycle chain 212.

(10) The at least one further recessed portion 268 and/or 269 is provided at one of the first connection end 54A and the second connection end 54B in one of the at least one chamfered portion 266 and/or 267. The other of the first connection end 54A and the second connection end 54B is free of another recessed portion in the one of the at least one chamfered portion 266 and/or 267. Accordingly, it is possible to achieve sufficient strength of the bicycle chain 212.

(11) The at least one further recessed portion 268 and/or 269 is offset toward the upstream side with respect to the chain-driving direction DR2 in the sprocket facing side S21. Accordingly, it is possible to improve the gear-holding performance of the bicycle chain 212 when the bicycle crank B5 (FIG. 1) reversely rotates with respect to the chain-driving direction as well as the effect of the further recessed portion 248 discussed using FIG. 31.

(12) The at least one chamfered portion 266 and/or 267 is provided in the first surface 62. Accordingly, it is possible to further improve the gear-holding performance.

(13) The link plate 218 or 220 includes the outer link plate. Accordingly, it is possible to effectively improve at least one of the gear-holding performance and the shifting performance of the outer link plate 218 or 220.

(14) The link plate 214 or 216 includes the inner link plate. Accordingly, it is possible to effectively improve at least one of the gear-holding performance and the shifting performance of the inner link plate 214 or 216.

Third Embodiment

A bicycle chain 312 in accordance with a third embodiment will be described below referring to FIGS. 32 to 51. The bicycle chain 312 has the same structure as that of the bicycle chain 12 except for the inner link plates 14 and 16 and the outer link plates 18 and 20. Thus, elements having substantially the same function as those in the first embodiment will be numbered the same here, and will not be described and/or illustrated again in detail here for the sake of brevity.

Figure 32:
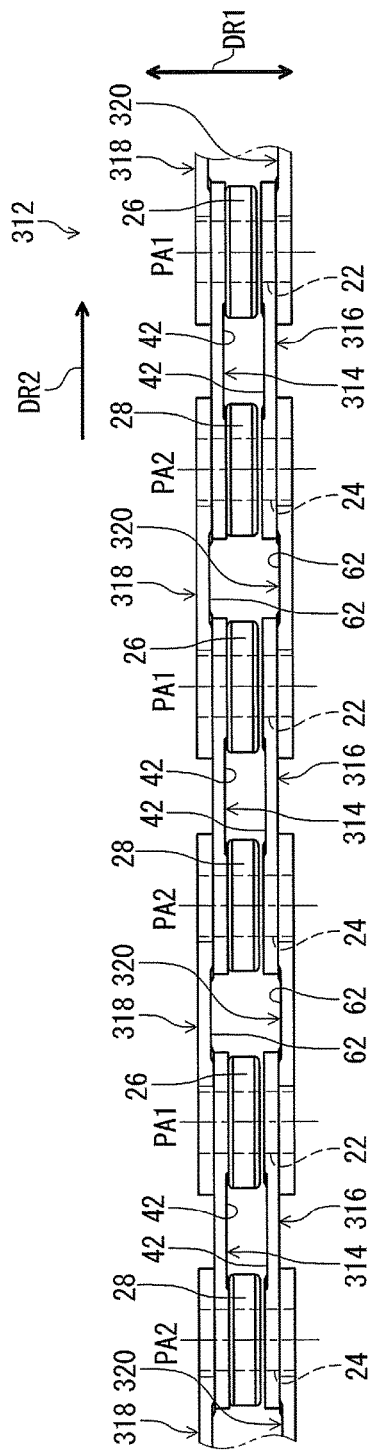
FIG. 32 is a partial plan view of a bicycle chain in accordance with a third embodiment.
Figure 33:
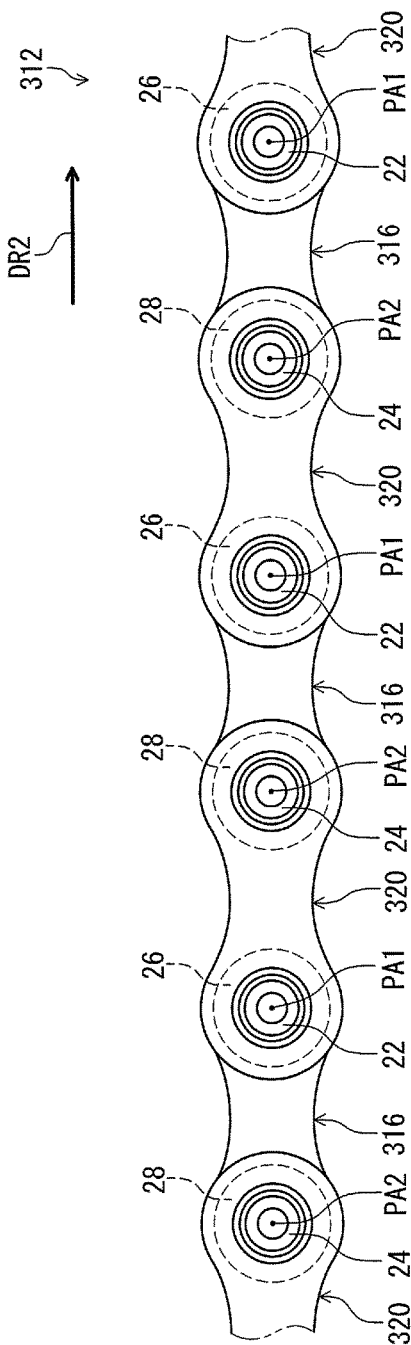
FIG. 33 is a partial side elevational view of the bicycle chain illustrated in FIG. 32.

As seen in FIGS. 32 and 33, the bicycle chain 312 comprises a link plate. The link plate includes an inner link plate. The link plate includes an outer link plate. In this embodiment, the bicycle chain 312 comprises an inner link plate 314, an inner link plate 316, an outer link plate 318, and an outer link plate 320. Specifically, the bicycle chain 312 comprises a plurality of inner link plates 314, a plurality of inner link plates 316, a plurality of outer link plates 318, and a plurality of outer link plates 320. The inner link plates 314 and 316 can also be referred to as link plates 314 and 316, respectively. The outer link plates 318 and 320 can also be referred to as link plates 318 and 320, respectively.

Since the link plate 316 has the same structure as that of the link plate 314, the structure of the link plate 316 will not be described and/or illustrated in detail here for the sake of brevity. Since the link plate 320 has the same structure as that of the link plate 318, the structure of the link plate 320 will not be described and/or illustrated in detail here for the sake of brevity. The link plate 316 can have a structure different from that of the link plate 314. The link plate 320 can have a structure different from that of the link plate 318.

Figure 34:
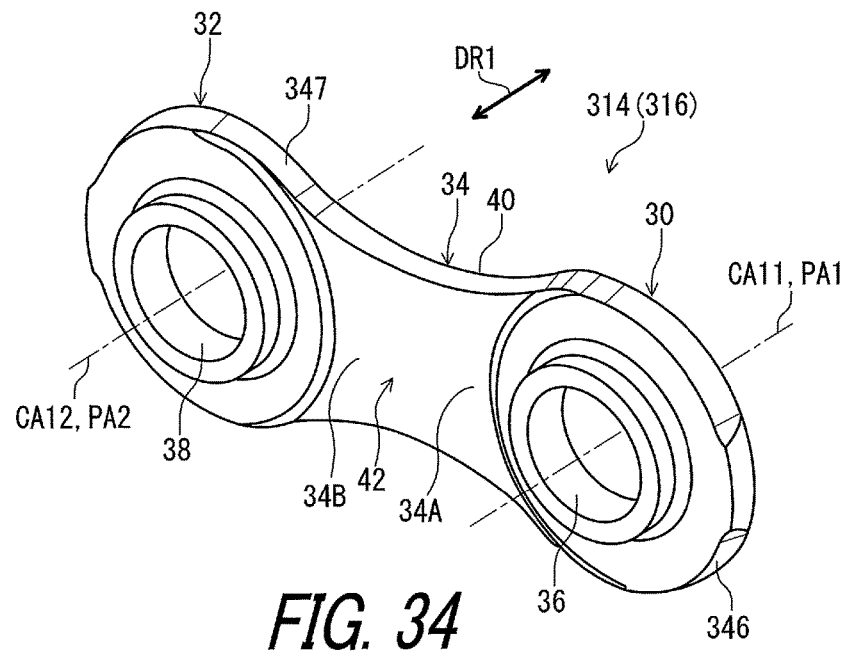
FIG. 34 is a perspective view of an inner link plate of the bicycle chain illustrated in FIG. 32.
Figure 35:
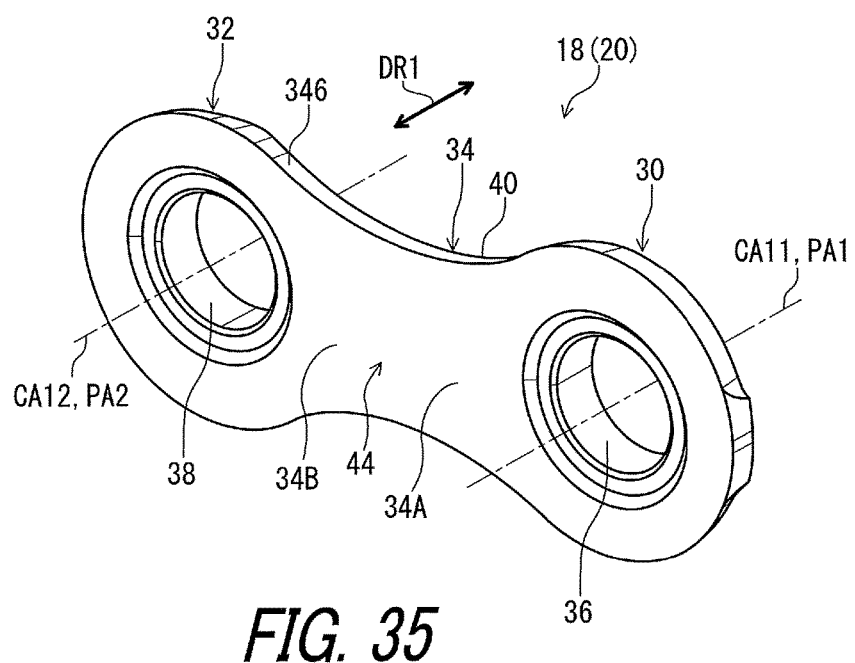
FIG. 35 is another perspective view of the inner link plate of the bicycle chain illustrated in FIG. 32.

As seen in FIGS. 34 and 35, the link plate 314 comprises the first end portion 30, the second end portion 32, and the intermediate portion 34. The intermediate portion 34 interconnects the first end portion 30 and the second end portion 32. The first end portion 30, the second end portion 32 and the intermediate portion 34 define an outer peripheral edge 40. The link plate 314 has substantially the same structure as that of the inner link plate 14 of the first embodiment.

Figure 36:
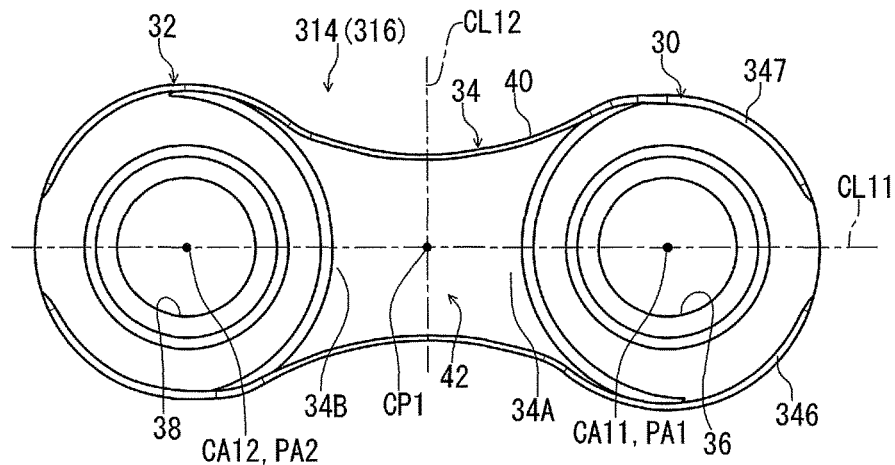
FIG. 36 is a side elevational view of the inner link plate of the bicycle chain illustrated in FIG. 32.
Figure 37:
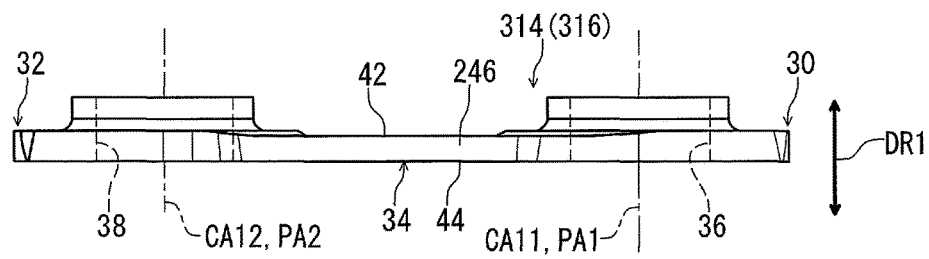
FIG. 37 is a bottom view of the inner link plate of the bicycle chain illustrated in FIG. 32.
Figure 38:
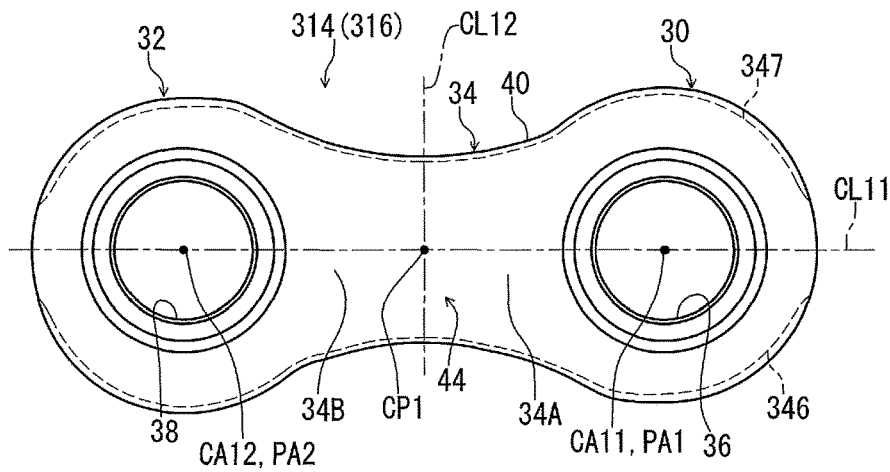
FIG. 38 is another side elevational view of the inner link plate of the bicycle chain illustrated in FIG. 32.

As seen in FIGS. 36 to 38, however, the link plate 314 comprises at least one chamfered portion 346 and/or 347 provided at least on the outer peripheral edge 40. The at least one chamfered portion 346 and/or 347 is provided in the first surface 42. In this embodiment, the at least one chamfered portion 346 and/or 347 includes a plurality of chamfered portions 346 and 347 each provided at least on the outer peripheral edge 40. The plurality of chamfered portions 346 and 347 are provided in the first surface 42. A total number of the at least one chamfered portion 346 and/or 347 is not limited to this embodiment.

As seen in FIG. 38, the link plate 314 does not comprise a chamfered portion in the second surface 44. However, the link plate 314 can comprise a chamfered portion in the second surface 44.

Figure 39:
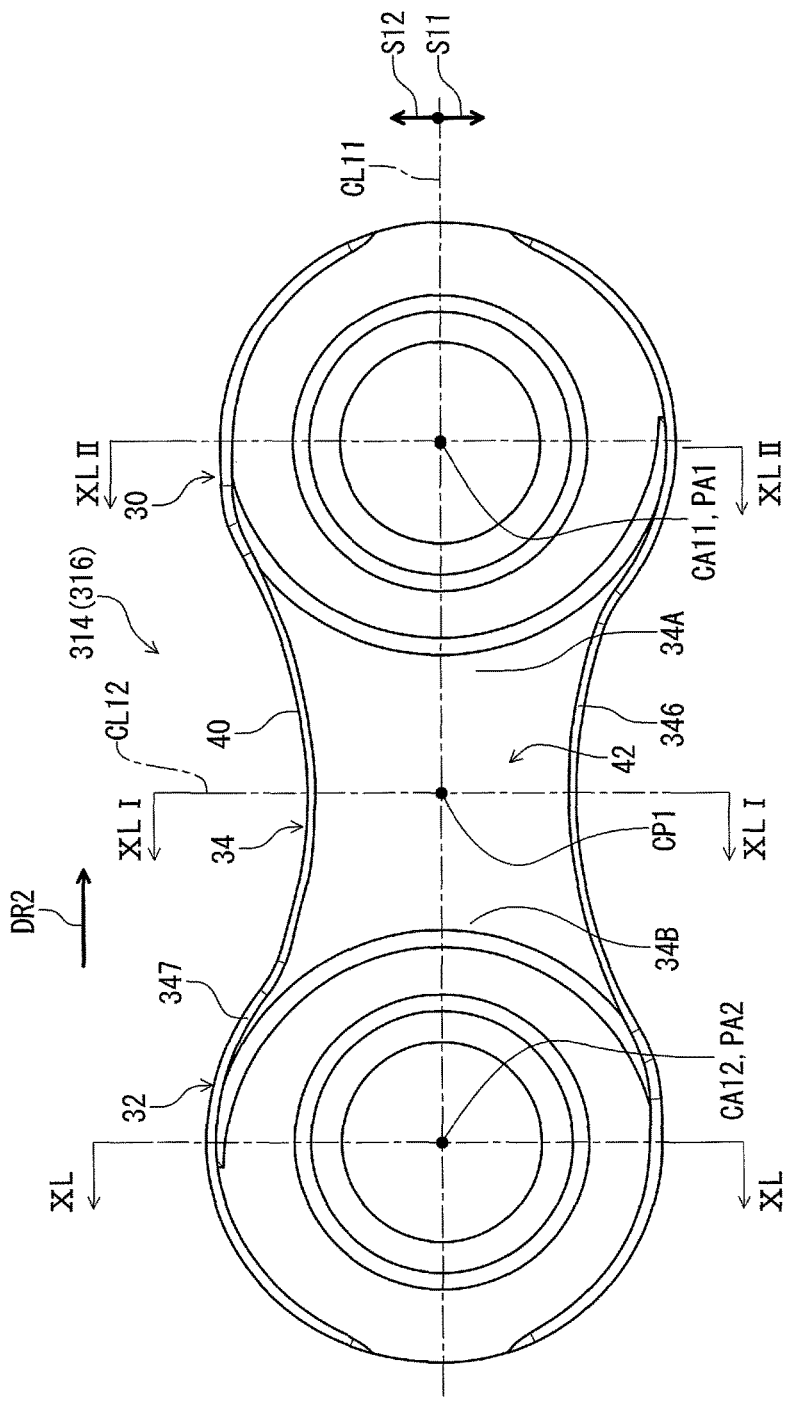
FIG. 39 is an enlarged side elevational view of the inner link plate of the bicycle chain illustrated in FIG. 32.

As seen in FIG. 39, the plurality of chamfered portions 346 and 347 are disposed symmetrically about the center point CP1. However, the plurality of chamfered portions 346 and 347 can be disposed asymmetrically about the center point CP1.

The chamfered portion 346 is provided on the sprocket facing side S11 with respect to the longitudinal centerline CL11. The chamfered portion 347 is provided on the sprocket far side S12 with respect to the longitudinal centerline CL11.

Figure 42:
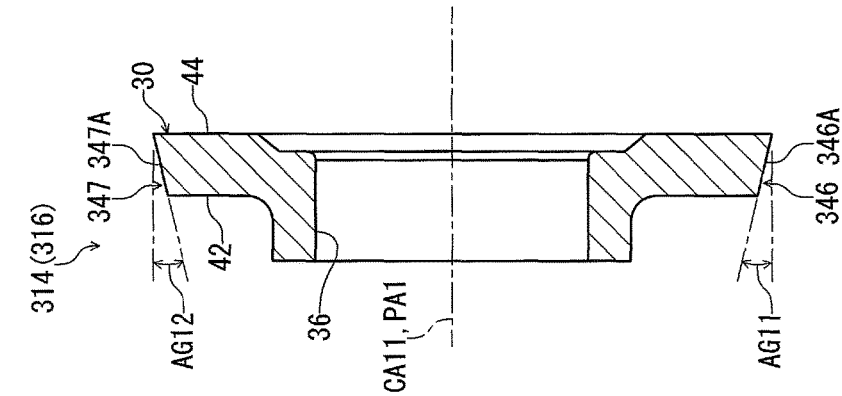
FIG. 42 is a cross sectional view of the inner link plate taken along line XLII-XLII of the FIG. 39.
Figure 41:
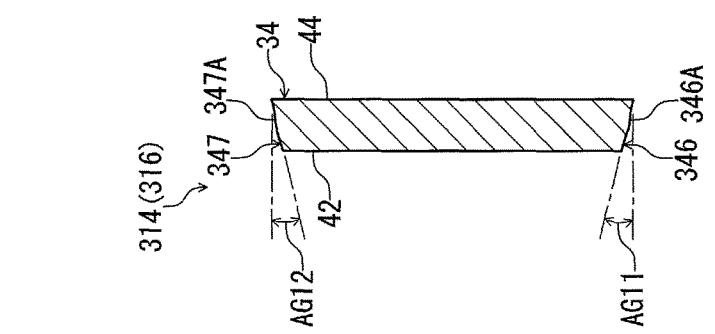
FIG. 41 is a cross sectional view of the inner link plate taken along line XLI-XLI of the FIG. 39.
Figure 40:
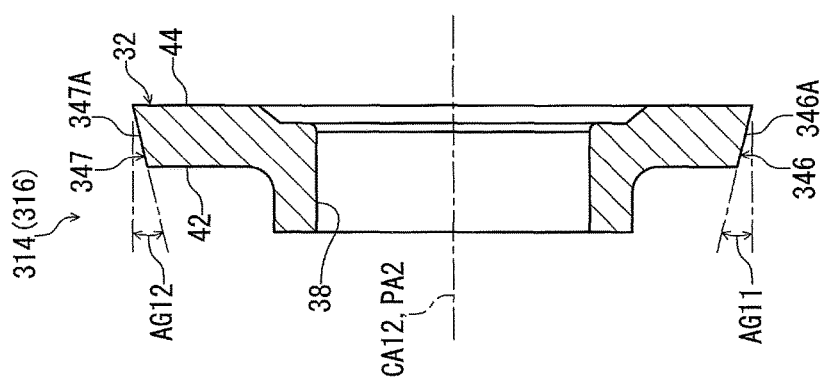
FIG. 40 is a cross sectional view of the inner link plate taken along line XL-XL of the FIG. 39.

As seen in FIGS. 40 to 42, the at least one chamfered portion 346 and/or 347 has a chamfered angle defined with respect to an axial direction DR1 parallel to the first center axis CA11. In this embodiment, the plurality of chamfered portions 346 and 347 respectively have chamfered angles AG11 and AG12. The chamfered portion 346 includes an inclined surface 346A inclined relative to the axial direction DR1 by the chamfered angle AG11. The chamfered portion 347 includes an inclined surface 347A inclined relative to the axial direction DR1 by the chamfered angle AG12. The chamfered angle AG11 is larger than 0 degree and equal to or smaller than 45 degrees. The chamfered angle AG12 is larger than 0 degree and equal to or smaller than 45 degrees. In this embodiment, the chamfered angles AG11 and AG12 are equal to each other. However, the chamfered angle AG11 can be different from the chamfered angle AG12.

Figure 43:
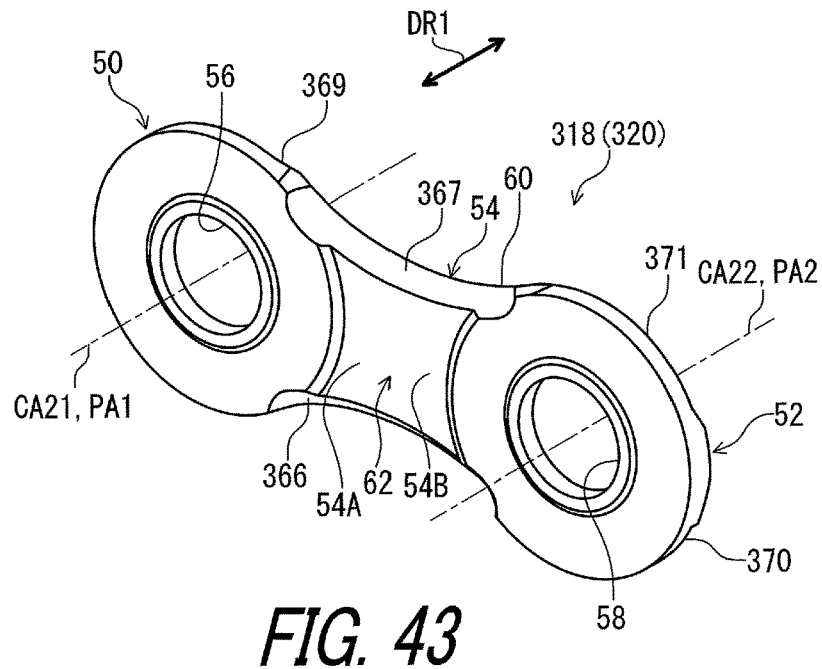
FIG. 43 is a perspective view of an outer link plate of the bicycle chain illustrated in FIG. 32.
Figure 44:
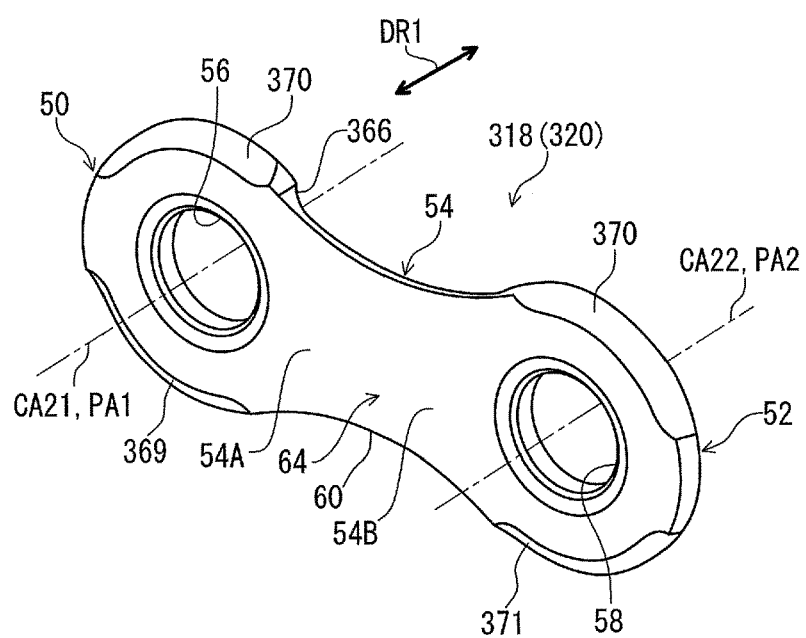
FIG. 44 is another perspective view of the outer link plate of the bicycle chain illustrated in FIG. 32.

As seen in FIGS. 43 and 44, the link plate 318 comprises the first end portion 50, the second end portion 52, and the intermediate portion 54. The intermediate portion 54 interconnects the first end portion 50 and the second end portion 52. The first end portion 50, the second end portion 52 and the intermediate portion 54 define an outer peripheral edge 60. The link plate 318 has substantially the same structure as that of the outer link plate 18 of the first embodiment.

Figure 45:
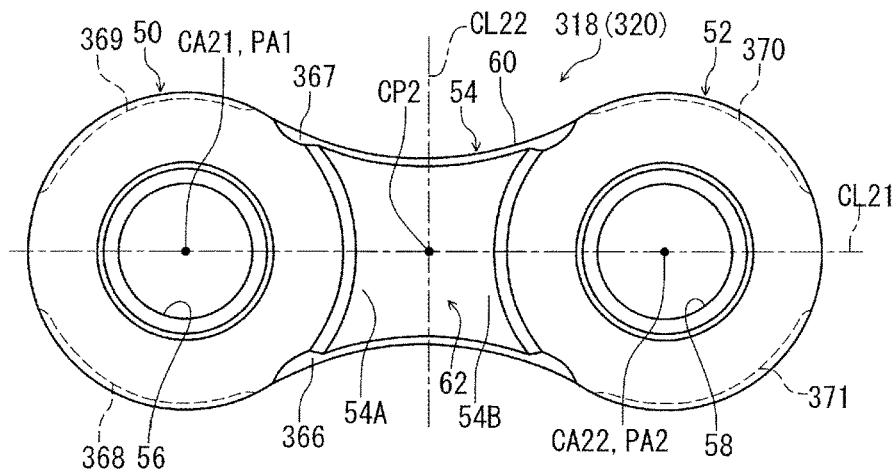
FIG. 45 is a side elevational view of the outer link plate of the bicycle chain illustrated in FIG. 32.
Figure 46:
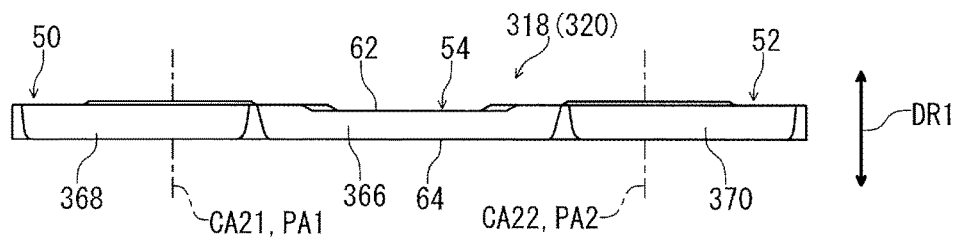
FIG. 46 is a bottom view of the outer link plate of the bicycle chain illustrated in FIG. 32.
Figure 47:
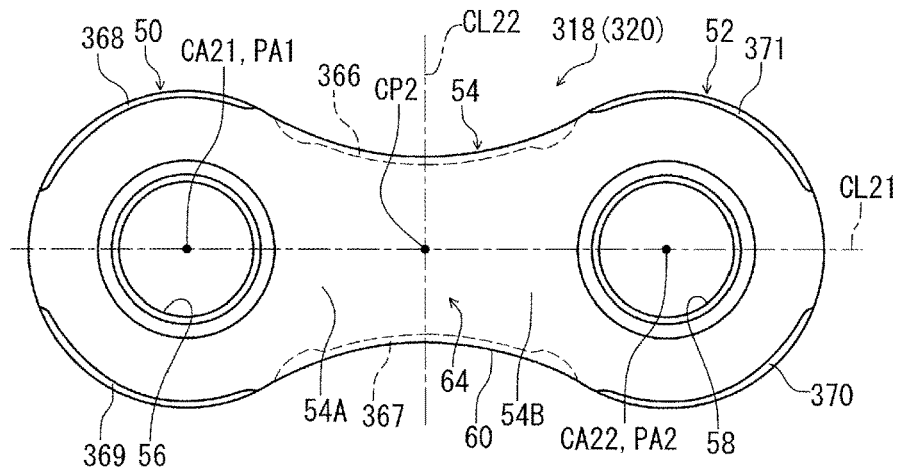
FIG. 47 is another side elevational view of the outer link plate of the bicycle chain illustrated in FIG. 32.

As seen in FIGS. 45 to 47, however, the link plate 318 comprises at least one chamfered portion 366, 367, 368, 369, 370, and/or 371 provided at least on the outer peripheral edge 60. In this embodiment, the at least one chamfered portion 366, 367, 368, 369, 370, and/or 371 includes a plurality of chamfered portions 366 to 371 each provided at least one the outer peripheral edge 60. The plurality of chamfered portions 366 and 367 are provided in the first surface 62. The plurality of chamfered portions 368 to 371 are provided in the second surface 64. A total number of the at least one chamfered portion 366, 367, 368, 369, 370, and/or 371 is not limited to this embodiment.

Figure 48:
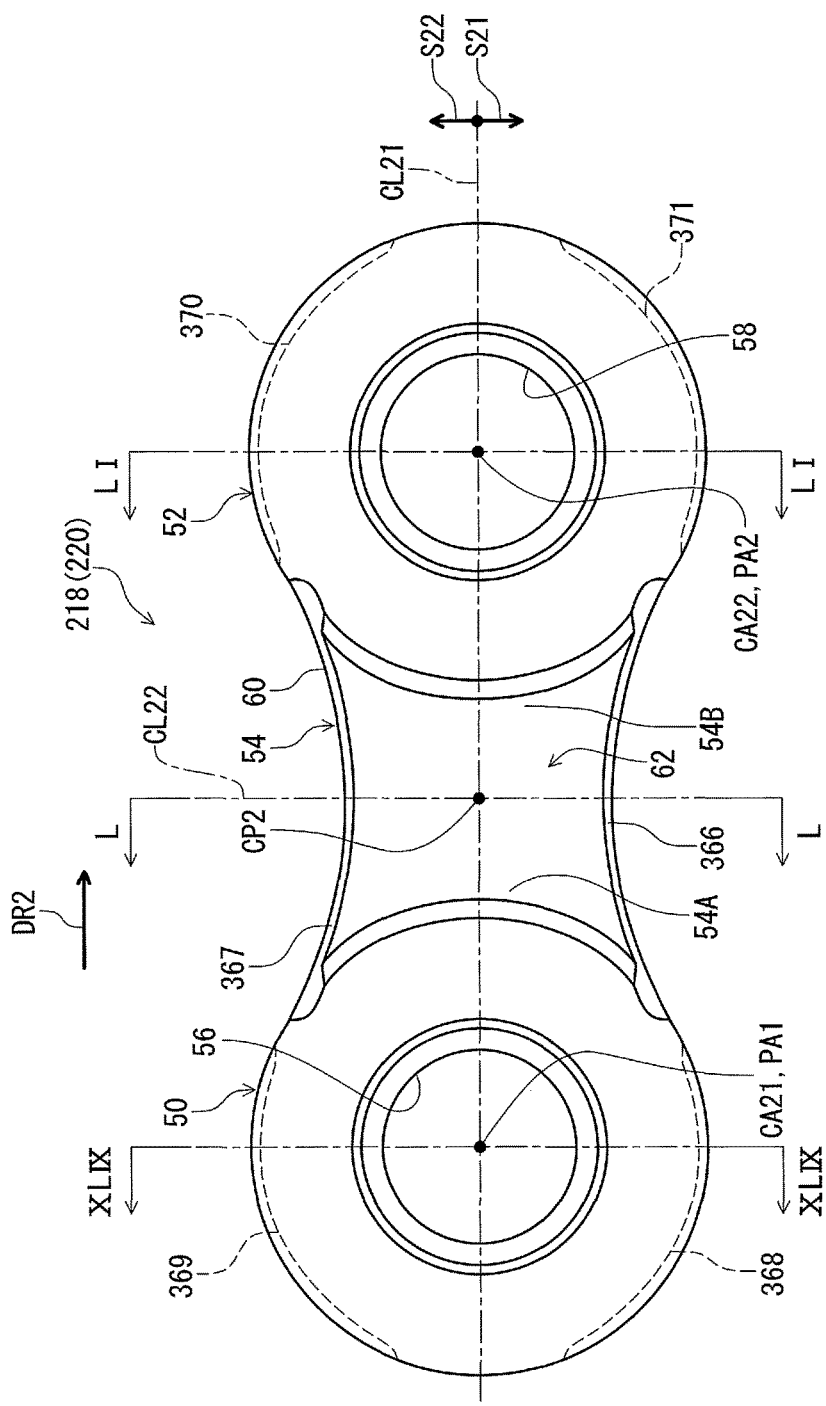
FIG. 48 is an enlarged side elevational view of the outer link plate of the bicycle chain illustrated in FIG. 32.

As seen in FIG. 48, the plurality of chamfered portions 366 and 367 are disposed symmetrically about the center point CP2. The plurality of chamfered portions 368 and 370 are disposed symmetrically about the center point CP2. The plurality of chamfered portions 369 and 371 are disposed symmetrically about the center point CP2. However, the plurality of chamfered portions 366 and 367 can be disposed asymmetrically about the center point CP2. The plurality of chamfered portions 368 and 370 can be disposed asymmetrically about the center point CP2. The plurality of chamfered portions 369 and 371 can be disposed asymmetrically about the center point CP2.

The chamfered portion 366 is provided on the sprocket facing side S21 with respect to the longitudinal centerline CL21. The chamfered portion 367 is provided on the sprocket far side S22 with respect to the longitudinal centerline CL21.

As seen in FIGS. 49 to 51, the at least one chamfered portion 366, 367, 368, 369, 370, and/or 371 has a chamfered angle defined with respect to an axial direction DR1 parallel to the first center axis CA21. In this embodiment, the plurality of chamfered portions 366 to 371 respectively have chamfered angles AG21 to AG26. The chamfered portion 366 includes an inclined surface 366A inclined relative to the axial direction DR1 by the chamfered angle AG21. The chamfered portion 367 includes an inclined surface 367A inclined relative to the axial direction DR1 by the chamfered angle AG22. The chamfered portion 368 includes an inclined surface 368A inclined relative to the axial direction DR1 by the chamfered angle AG23. The chamfered portion 369 includes an inclined surface 369A inclined relative to the axial direction DR1 by the chamfered angle AG24. The chamfered portion 370 includes an inclined surface 370A inclined relative to the axial direction DR1 by the chamfered angle AG25. The chamfered portion 371 includes an inclined surface 371A inclined relative to the axial direction DR1 by the chamfered angle AG26.

The chamfered angle AG21 is larger than 0 degree and equal to or smaller than 45 degrees. The chamfered angle AG22 is larger than 0 degree and equal to or smaller than 45 degrees. The chamfered angle AG23 is larger than 0 degree and equal to or smaller than 45 degrees. The chamfered angle AG24 is larger than 0 degree and equal to or smaller than 45 degrees. The chamfered angle AG25 is larger than 0 degree and equal to or smaller than 45 degrees. The chamfered angle AG26 is larger than 0 degree and equal to or smaller than 45 degrees. In this embodiment, the chamfered angles AG21 to AG26 are equal to each other. However, at least one of the chamfered angles AG21 to AG26 can be different from another chamfered angle.

The bicycle chain 312 includes the following features.

(1) The at least one chamfered portion 346 and/or 347 has the chamfered angle AG11 and/or AG12 defined with respect to the axial direction DR1 parallel to the first center axis CA11. The chamfered angle AG11 and/or AG12 is larger than 0 degree and equal to or smaller than 45 degrees. Accordingly, it is possible to effectively improve strength of the bicycle chain 312.

(2) The at least one chamfered portion 366, 367, 368, 369, 370, and/or 371 has the chamfered angle AG21, AG22, AG23, AG24, AG25, and/or AG26 defined with respect to the axial direction DR1 parallel to the first center axis CA21. The chamfered angle AG21, AG22, AG23, AG24, AG25, and/or AG26 is larger than 0 degree and equal to or smaller than 45 degrees. Accordingly, it is possible to effectively improve strength of the bicycle chain 312.

(3) The link plate 318 or 320 includes an outer link plate. Accordingly, it is possible to effectively improve strength of the outer link plate 318 or 320.

(4) The link plate 314 or 316 includes an inner link plate. Accordingly, it is possible to effectively improve strength of the inner link plate 314 or 316.

It will be apparent to those skilled in the bicycle field from the present disclosure that the above embodiments can at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle chain comprising:
    an inner link plate comprising:
        a first inner-link end portion including a first inner-link opening having a first inner-link center axis;
        a second inner-link end portion including a second inner-link opening having a second inner-link center axis;
        an inner-link intermediate portion interconnecting the first inner-link end portion and the second inner-link end portion, the first inner-link end portion, the second inner-link end portion and the inner-link intermediate portion defining an inner-link outer peripheral edge;
        a first inner-link surface;
        a second inner-link surface opposite to the first inner-link surface in an axial direction parallel to the first inner-link center axis;
        at least one first inner-link chamfered portion provided at least on the inner-link outer peripheral edge in the first inner-link surface; and
        at least one second inner-link chamfered portion provided at least on the inner-link outer peripheral edge in the second inner-link surface, the at least one first inner-link chamfered portion having a first non-overlapped portion with respect to the at least one second inner-link chamfered portion when viewed from the axial direction, the at least one second inner-link chamfered portion having a second non-overlapped portion with respect to the at least one first inner-link chamfered portion when viewed from the axial direction.

2. The bicycle chain according to claim 1, wherein the at least one first inner-link chamfered portion is disposed in the first inner-link surface without overlapping with the at least one second inner-link chamfered portion when viewed from the axial direction.

3. The bicycle chain according to claim 1, wherein the at least one first inner-link chamfered portion includes a plurality of first inner-link chamfered portions each provided at least on the inner-link outer peripheral edge in the first inner-link surface.

4. The bicycle chain according to claim 3, wherein the inner link plate has
    an inner-link longitudinal centerline,
    an inner-link traverse centerline perpendicular to the inner-link longitudinal center line, and
    an inner-link center point at which the inner-link longitudinal centerline and the inner-link traverse centerline intersect with each other, and
the plurality of first inner-link chamfered portions are disposed symmetrically about the inner-link center point.

5. The bicycle chain according to claim 1, wherein the at least one second inner-link chamfered portion includes a plurality of second inner-link chamfered portions each provided at least on the inner-link outer peripheral edge in the second inner-link surface.

6. The bicycle chain according to claim 5, wherein the inner link plate has
    an inner-link longitudinal centerline,
    an inner-link traverse centerline perpendicular to the inner-link longitudinal center line, and
    an inner-link center point at which the inner-link longitudinal centerline and the inner-link traverse centerline intersect with each other, and
the plurality of second inner-link chamfered portions are disposed symmetrically about the inner-link center point.

7. The bicycle chain according to claim 1, wherein the at least one first inner-link chamfered portion is provided in one of the first inner-link end portion and the second inner-link end portion, and
the at least one second inner-link chamfered portion is provided in the other of the first inner-link end portion and the second inner-link end portion.

8. The bicycle chain according to claim 7, wherein the at least one first inner-link chamfered portion is further provided in the inner-link intermediate portion.

9. The bicycle chain according to claim 1, wherein the at least one first inner-link chamfered portion has a first inner-link chamfered length defined along the inner-link outer peripheral edge,
the at least one second inner-link chamfered portion has a second inner-link chamfered length defined along the inner-link outer peripheral edge, and
the second inner-link chamfered length is different from the first inner-link chamfered length.

10. The bicycle chain according to claim 9, wherein the first inner-link chamfered length is larger than the second inner-link chamfered length.

11. The bicycle chain according to claim 1, wherein the inner link plate has
    an inner-link longitudinal centerline,
    an inner-link sprocket facing side defined with respect to the inner-link longitudinal centerline, and
    an inner-link sprocket far side defined on an opposite side of the inner-link sprocket facing side with respect to the inner-link longitudinal centerline, the inner-link sprocket facing side being closer to a rotational center axis of a bicycle sprocket than the inner-link sprocket far side in a state where the bicycle chain is engaged with the bicycle sprocket, and
the at least one first inner-link chamfered portion is offset toward a downstream side with respect to a chain-driving direction in the inner-link sprocket facing side in the state where the bicycle chain is engaged with the bicycle sprocket.

12. The bicycle chain according to claim 11, wherein the at least one second inner-link chamfered portion is offset toward an upstream side with respect to the chain-driving direction in the inner-link sprocket facing side in the state where the bicycle chain is engaged with the bicycle sprocket.

13. The bicycle chain according to claim 1, wherein the first inner-link surface is configured to face an opposed inner link plate in a state where the bicycle chain is assembled.

14. The bicycle chain according to claim 1, further comprising:
an outer link plate having an outer-link opening having a first outer-link center axis aligned with the first inner-link center axis of the first inner-link opening,
wherein the inner link plate is provided closer to a center axis of the bicycle chain than the outer link plate.

\* \* \* \* \*